United States Patent
Dorbie

(10) Patent No.: US 8,237,709 B2
(45) Date of Patent: Aug. 7, 2012

(54) METHOD AND APPARATUS FOR OPTIMIZING TRIANGLES INTO TRIANGLE STRIPS ACCORDING TO A VARIETY OF CRITERIA

(75) Inventor: Angus MacDonald Dorbie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1086 days.

(21) Appl. No.: 12/140,720

(22) Filed: Jun. 17, 2008

(65) Prior Publication Data
US 2009/0073166 A1    Mar. 19, 2009

Related U.S. Application Data

(60) Provisional application No. 60/970,436, filed on Sep. 6, 2007.

(51) Int. Cl.
*G06T 15/30* (2006.01)
*G06T 15/10* (2006.01)
*G09G 5/36* (2006.01)

(52) U.S. Cl. .................. 345/423; 345/427; 345/557

(58) Field of Classification Search .................. 345/506, 345/423, 427, 623
See application file for complete search history.

(56) References Cited

U.S. PATENT DOCUMENTS

| 6,426,747 B1 * | 7/2002 | Hoppe et al. .................. 345/419 |
| 2004/0075655 A1 * | 4/2004 | Dunnett ....................... 345/418 |

* cited by examiner

*Primary Examiner* — Hau Nguyen
(74) *Attorney, Agent, or Firm* — James T. Hagler

(57) ABSTRACT

Methods and computing devices enable optimized triangle strip generation using forward looking game tree evaluation methods with node evaluation of strip options based on desired performance criteria. The evaluation of possible triangle paths is performed using metrics which may be weighted for each desirable criteria at each move depth. A recursive algorithm may be used to recursively descend through alternative triangle paths and accumulates a score for the path. The final score for each evaluated triangle path at a dead end or maximum depth of evaluation provides a basis for selecting the best alternative path from the base or root triangle for graphic processing. This evaluation or alternative triangle paths may be repeated to select each subsequent triangle for processing or may be repeated after a number of triangles within the selected path have been processed.

35 Claims, 18 Drawing Sheets

| | | V1 | V2 | V3 | V4 | V5 | V6 | V7 | V8 |
|---|---|---|---|---|---|---|---|---|---|
| 150 → Index | | | | | | | | | |
| 152 → Coordinates | x y z | $x_1$ $y_1$ $z_1$ | $x_2$ $y_2$ $z_2$ | $x_3$ $y_3$ $z_3$ | $x_4$ $y_4$ $z_4$ | $x_5$ $y_5$ $z_5$ | $x_6$ $y_6$ $z_6$ | $x_7$ $y_7$ $z_7$ | $x_8$ $y_8$ $z_8$ |
| 154 → Color | r g b | $r_1$ $g_1$ $b_1$ | $r_2$ $g_2$ $b_2$ | $r_3$ $g_3$ $b_3$ | $r_4$ $g_4$ $b_4$ | $r_5$ $g_5$ $b_5$ | $r_6$ $g_6$ $b_6$ | $r_7$ $g_7$ $b_7$ | $r_8$ $g_8$ $b_8$ |
| 156 → Surface Normal | $n_x$ $n_y$ $n_z$ | $nx_1$ $ny_1$ $nz_1$ | $nx_2$ $ny_2$ $nz_2$ | $nx_3$ $ny_3$ $nz_3$ | $nx_4$ $ny_4$ $nz_4$ | $nx_5$ $ny_5$ $nz_5$ | $nx_6$ $ny_6$ $nz_6$ | $nx_7$ $ny_7$ $nz_7$ | $nx_8$ $ny_8$ $nz_8$ |
| 158 → Texture Coordinate | s t | $s_1$ $t_1$ | $s_2$ $t_2$ | $s_3$ $t_3$ | $s_4$ $t_4$ | $s_5$ $t_5$ | $s_6$ $t_6$ | $s_7$ $t_7$ | $s_8$ $t_8$ |
| 160 → Other | a b c | $a_1$ $b_1$ $c_1$ | $a_2$ $b_2$ $c_2$ | $a_3$ $b_3$ $c_3$ | $a_4$ $b_4$ $c_4$ | $a_5$ $b_5$ $c_5$ | $a_6$ $b_6$ $c_6$ | $a_7$ $b_7$ $c_7$ | $a_8$ $b_8$ $c_8$ |

FIG. 12

METHOD AND APPARATUS FOR OPTIMIZING TRIANGLES INTO TRIANGLE STRIPS ACCORDING TO A VARIETY OF CRITERIA

Claim of Priority under 35 U.S.C. §119

The present Application for Patent claims priority to Provisional Application No. 60/970,436 filed Sep. 6, 2007, and assigned to the assignee hereof and hereby expressly incorporated by reference herein.

FIELD OF THE INVENTION

The present invention relates generally to computer graphics technologies, and more particularly to methods and apparatus for optimizing rendering of computer graphics.

BACKGROUND

In computer generated graphics, practically every object viewed in a 3-D graphics screen is modeled as a large number of triangle polygons. Graphic processing of polygons, and in particular triangles, simplifies the complex processes of object modeling, image transformation and image rendering.

Using a sufficient number of triangles any shape and surface can be approximated. For example, FIG. 1 illustrates an object (a rabbit 100) to be modeled in a computer graphics scene. In order to model this object so that it can be manipulated and rendered using computer graphics software and hardware, a graphics developer will transform the model into a mesh model 102 of triangle polygons 104 as illustrated in FIG. 2. Each triangle has three vertices, so adjacent triangles have a common side and two common vertices. Graphics hardware and software then digests such triangle polygons in a number of mathematically complex transformations in order to generate pixels for display on the graphic screen. Each vertex in each triangle is transformed to the screen and then rasterized into pixels which are eventually written into the frame buffer by what is known as a graphics pipeline.

Since the transformation of polygon models into pixels involves extensive mathematical transformations, hardware and software developers are motivated to package and process the triangles in the most efficient manner to minimize the amount of processing that needs to be accomplished. While some methods have been developed, they suffer from a number of deficiencies and may not yield efficient processing of modeled objects in all hardware or software implementations.

SUMMARY

Various embodiments provide methods for optimizing the sequencing of triangles for processing to form triangle strips in a computer graphics processing application based upon a one or more of a variety of evaluation criteria. Before triangles are selected for processing in a graphics pipeline, a look-ahead or game-tree evaluation of optional paths down to a predetermined depth is performed. Each optional path is evaluated or scored against one or more performance criteria to obtain a path score. The optional path that is evaluated to have the highest score may then be used to select the next one or more triangles for transformation by the graphics pipeline. The look-ahead evaluation of triangle paths may be performed in software using recursive algorithms or performed in hardware, or a mix of hardware and software. The criteria may be any graphics processing performance, resource usage, or predictive parameter related to the generation and transformation of triangle strips for streamlining the transformation of triangles in a graphics pipeline.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 12 illustrates a data structure for indexing triangle vertex coordinates for use with the various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used to mean "serving as an example, instance, or illustration." Any implementation described herein as "exemplary" is not necessarily to be construed as preferred or advantageous over other implementations.

In this description, the term "triangle" is used to refer to a polygon used to model objects for using in computer graphics. While the preferred embodiment is suitable for triangles polygon computer graphic models, the various embodiments may also be applied and equally useful with computer graphics processing which models objects as a plurality of non-triangle polygons. Thus, the term "triangle" as used herein is not intended to limit the scope of the disclosure and the claims to triangle polygons.

Figure 24:
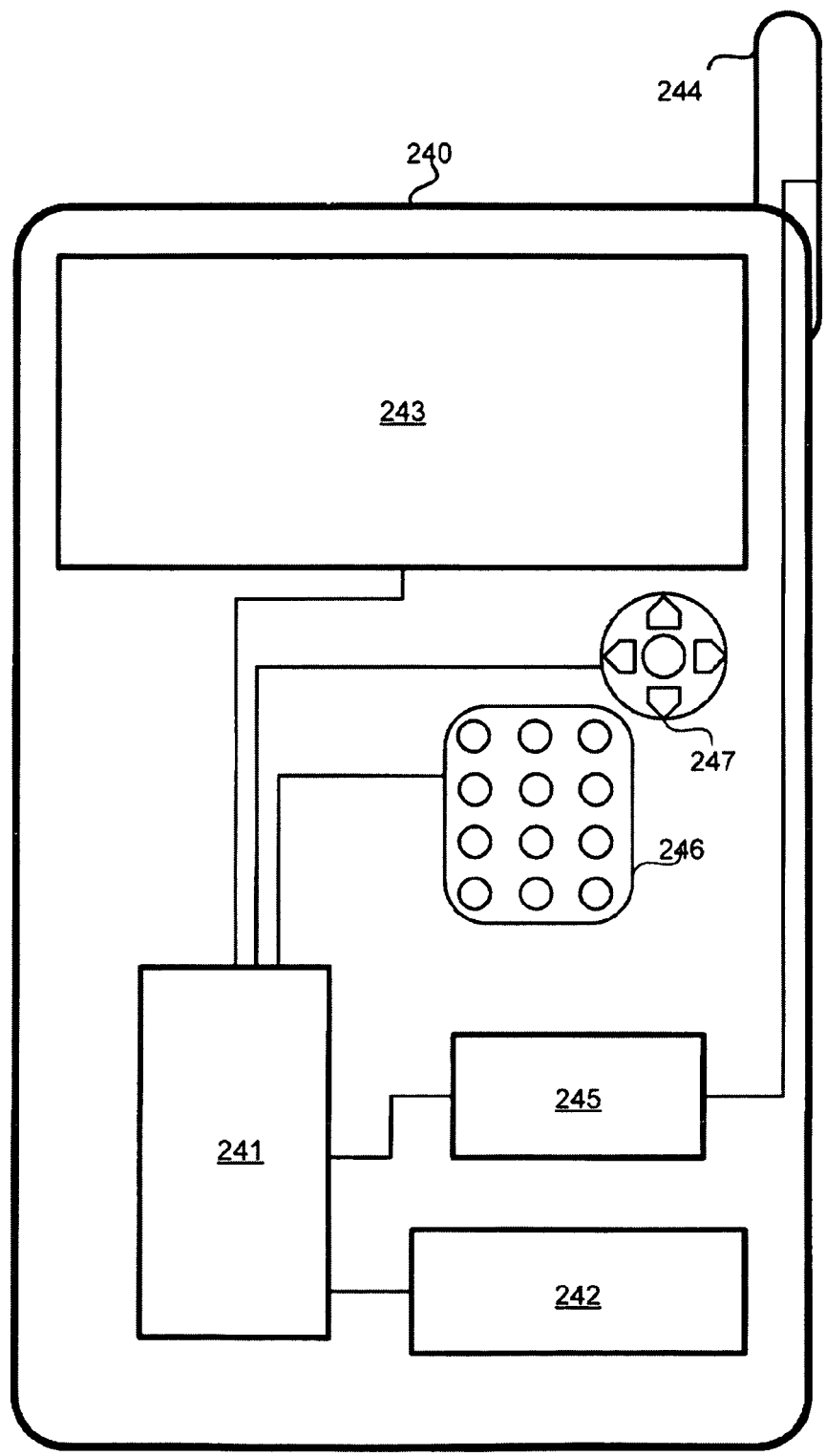
FIG. 24 is a component block diagram of a mobile computing device suitable for use with the various embodiments.

As used herein the terms "computer" and "computer system" are intended to encompass any form of programmable computer as may exist or will be developed in the future, including, for example, personal computers, laptop computers, mobile computing devices (e.g., cellular telephones, personal data assistants (PDA), palm top computers, and multifunction mobile devices), main frame computers, servers, and integrated computing systems. A computer typically includes a software programmable processor coupled to a memory circuit, but may further include the components described below with reference to FIGS. 24 and 25.

The processing of objects modeled for computer graphics in a variety of applications, such as gaming applications, involves many complex mathematical transformations of a large number of triangle polygons used to model objects. A variety of methods have been introduced for selecting the order in which particular triangles are processed (i.e., converted into pixels). If triangles are processed in strips of adjacent triangles as described herein, the number of mathematical transformations that must be performed is reduced as each subsequent triangle in a triangle strip requires processing at most a single additional vertex. Thus, methods have been introduced for selecting triangles for processing in order to process them in triangle strips. Such methods typically involve selecting the next adjacent triangle until no more adjacent triangles remain to be processed.

Known methods for processing triangles in triangle strips may not process triangles in an optimum fashion. Each triangle in a building triangle strip has up to two directional options, except the first triangle in a strip which has up to three directional options. Each direction choice at each triangle may have different costs on different platforms. Further, if adjacent triangles are not properly selected, some triangles in an object may be isolated, requiring new triangle paths to be established, or may not be efficiently processed (e.g., requiring the generation of degenerate triangles in order to process the triangle). As a result, a cost will be paid in terms of additional processing time because the triangle strips were not formed in a most efficient manner. Additionally, some hardware and software implementations may incur a different costs associated with triangle strip formation not accommodated by known rigid methods.

To overcome these disadvantages, various embodiments provide methods for selecting triangles for conversion in the form of triangle strips within modeled objects in order to yield an optimum sequence for processing of triangles according to definable performance-related criteria. The performance-related criteria for optimizing triangle selection may vary from implementation to implementation. The methods and apparatus employ game tree methods in order to look ahead and evaluate alternative paths (i.e., sequences of adjacent triangle selections) that may be implemented in processing triangles in the form of triangle strips. Each alternative path through a complex of triangles is determined to a preset depth (i.e., a preset number of steps down a game tree) or until no further triangles can be evaluated, such as when a dead end is reached or when all triangles in an object have been evaluated. At this point a score is determined for the path according to the performance-related criterion or criteria against which the triangle strips are being optimized. The process continues evaluating each alternative path branching from triangles within each path in order to obtain scores for all path options extending from the first triangle (some times referred to herein as the root or base triangle). Once all of the alternative paths extending from the root triangle have been evaluated, the alternative path selection (i.e., the next triangle choice for processing) associated with the highest evaluated path score is selected and the next triangle along that path selected for graphic processing. The process of looking ahead to alternative triangle strip paths may be performed again after each selected triangle is converted using the previously selected triangle as the root triangle. Alternatively, the process of looking ahead to alternative triangle strip paths may be performed after a number of triangles in the selected path have been converted, using the last converted triangle as the root triangle. In this manner, triangle paths leading to dead ends or isolated triangles may be avoided. The performance-related criteria may include one or more of use of vertex cache, number of vertices transformed, use of the limited size cache, triangle swaps incurred (degenerate triangles issued), cache misses, number of isolate triangles remaining, etc.

Figure 1:
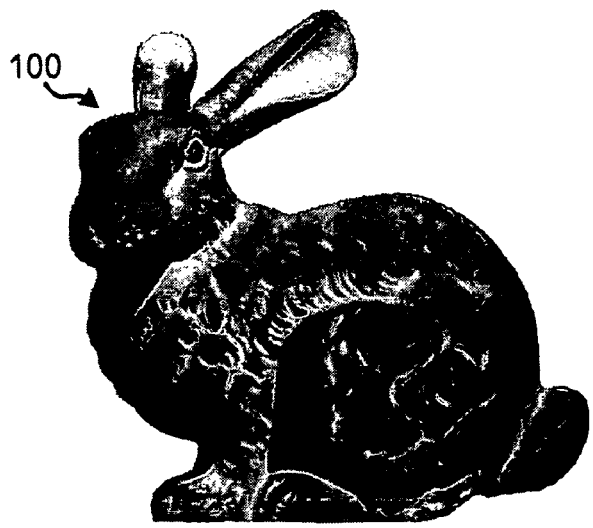
FIG. 1 is an image of an object to be modeled for manipulation in a computer graphics system.
Figure 2:
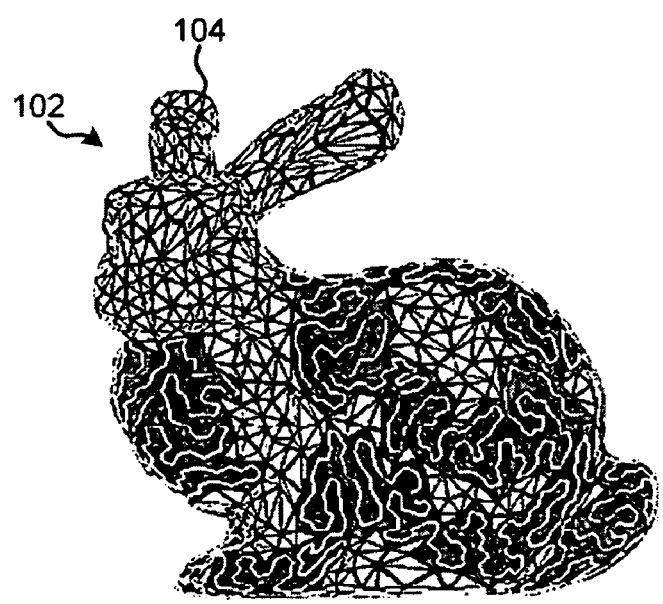
FIG. 2 is an image of the object illustrated in FIG. 1 modeled as a plurality of triangle polygons suitable for manipulation in a computer graphics system.
Figure 3:
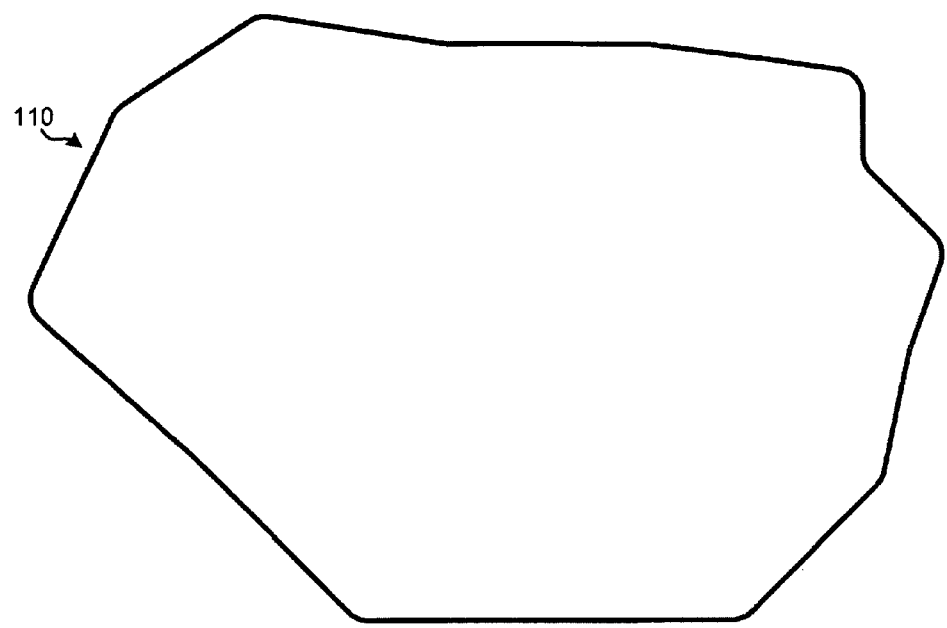
FIG. 3 is an image of a simple object to be modeled in a computer graphics system.
Figure 4:
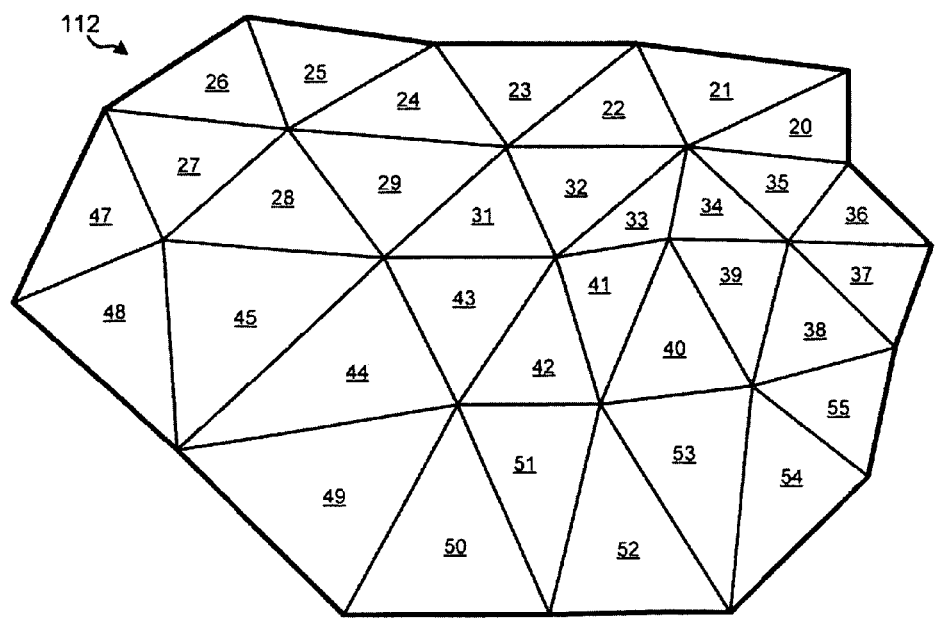
FIG. 4 shows the simple object of FIG. 3 modeled as a plurality of triangle polygons.

To better explain the embodiments, references will be made to processing of the graphic object 110 illustrated in FIG. 3. This irregular shaped object could be a rock, a piece of metal or some other element within a graphic scene in graphic application, such as a game application for example. In order for a computer graphic system to process this modeled object 110, the application developer will model the object's surface as a network of triangles 20-55 as illustrated in FIG. 4. By using a sufficient number of triangles, the shape and surface contours of the object 110 can be approximated by a modeled object 112 that can be easily manipulated by the computer graphics system to render 2-D and 3-D images.

Figure 5:
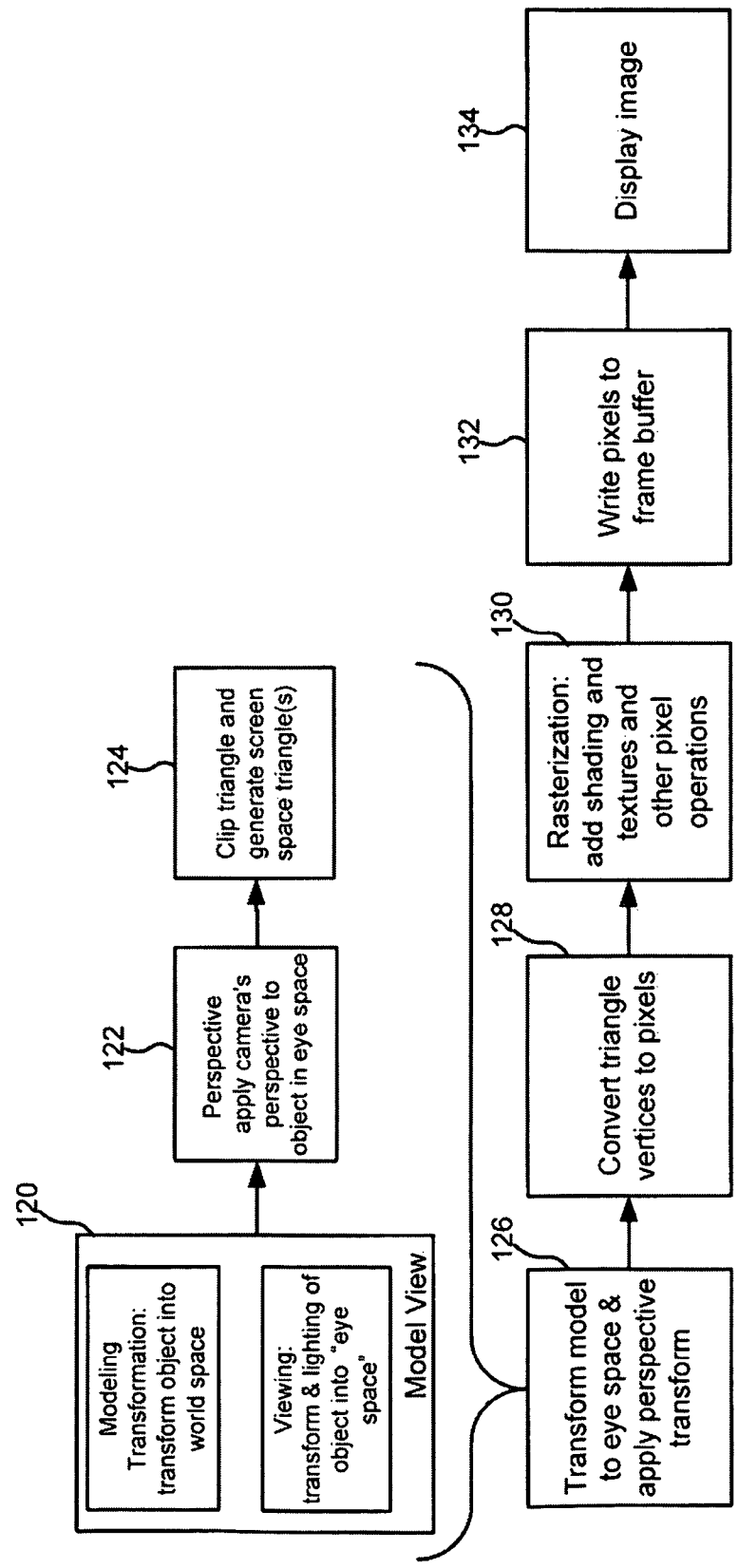
FIG. 5 is a simplified process flow diagram of a typical graphics pipeline.

Graphic processing within computing devices is typically performed in a graphics pipeline. A functional block diagram of a computer graphics pipeline and the steps involved in transforming and converting triangles 20-55 of the modeled object 112 are illustrated in FIG. 5. As a first step, the graphics pipeline transforms a modeled object 112 in model space into "eye space," which is the shape and location of the object when viewed from the perspective of the graphics screen, and applies perspective to the modeled object 112, step 126. This step 126 is sometimes referred to as "transformation" and may be accomplished in hardware or software or a combination of both. As part of the transformation process, the graphics software may first transform the object within "model space" to reflect its position and movement within the coordinates of the game (or other application), and then transform the object into "eye space," together step 120. This processing positions the modeled object 112 within a particular image frame according to what is happening to the object in the game application (i.e., within model space), and then transforms this modeled object 112 to reflect the viewing angle that one would have when looking through the window of the computer graphics screen (i.e., within eye space). With the object transformed into eye space, the computer graphics system may then adjust the apparent shape of the modeled object 112 in order to apply 3-D perspective appropriate for the modeled object's location within eye space, step 122. In applying perspective, portions of the modeled object 112 that are closer to the image screen are made larger while portions of the object further away are made smaller. Finally, the image is clipped to include only that part of the space which would be viewed through the graphics screen, step 124. Thus, the process of transformation selects a subset of triangles within modeled objects that would be viewed from the perspective of the computer graphics screen, and ignores triangles that would not be visible (e.g., hidden by other objects or by the contours of the object itself) or lie outside the screen space.

When the modeled object 112 triangles 20-55 have been transformed into the proper eye space perspective and clipped to the size of the screen, information related to the vertices are used to generate pixels for the display, step 128. In this process, coordinate values associated with each vertex are used to calculate the position and image information within one or more display pixels. As discussed in further detail below with reference to FIG. 12, each vertex includes a large number of coordinate values which specify the location, color, surface normal, textures and shading, as well as other characteristics which are useful for generating display pixels. The computations required to convert triangle vertices into pixels are complex and involve large amounts of data. Consequently, significant performance improvements can be achieved by organizing the conversion of triangles so that the number of vertex-to-pixel conversions is minimized. In some architectures performance can also be improved by maximizing uses of cache memory or working within a limited cache size. The various embodiments involve operations which occur after transformation, step 126, and before conversion of triangle vertices into pixels, step 128.

After pixels are generated, shading and textures are applied to the pixels as well as other operations associated with the graphics generation, step 130. Once pixels have been rasterized, they are written to the image frame buffer, step 132, from which they are immediately sent to the display in order to display the image, step 134.

As discussed above, a commonly used method for minimizing the number of vertex-to-pixel conversions is to process triangles in a selected order so that the results for two shared vertices of adjoining triangle vertices can be leveraged. Thus, in most graphics processing systems triangles are typically converted in contiguous strips such as illustrated in FIGS. 6 and 7.

Figure 6:
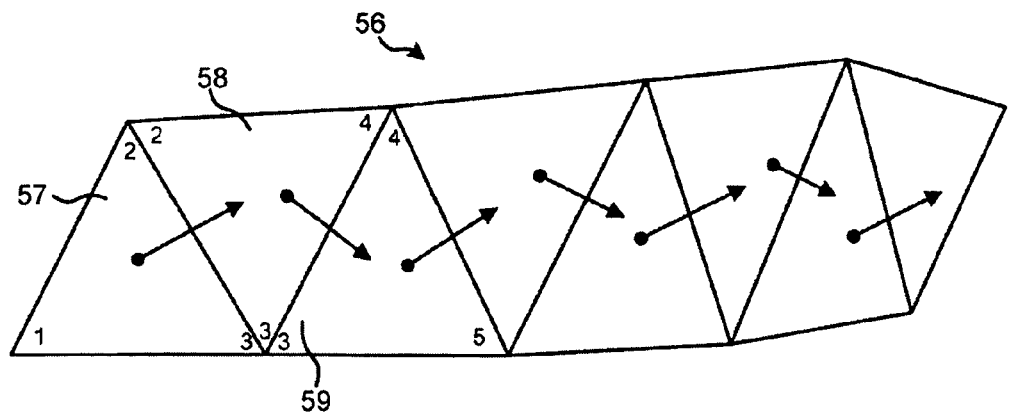
FIGS. 6 and 7 are illustrations of a simple triangle strip illustrating processing of triangles in a graphics system.
Figure 7:
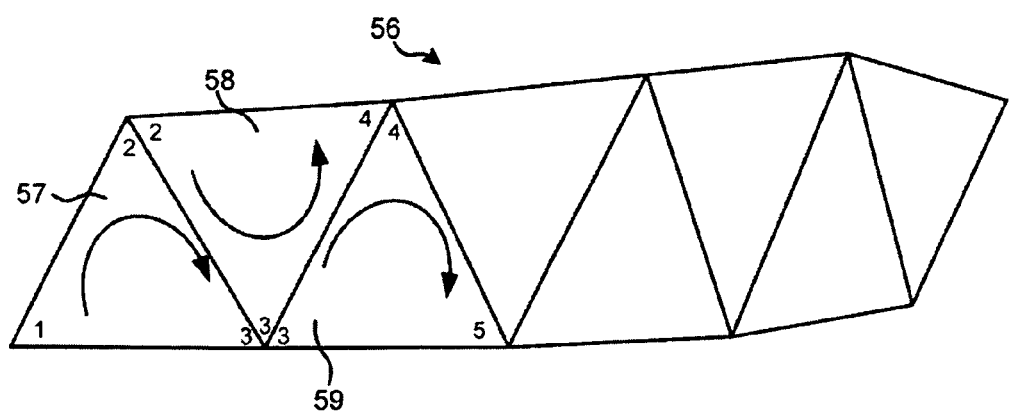

Referring to FIG. 6 it can be seen that the conversion of triangle vertices in a triangle strip reduces the number of vertex conversions required. For example, if the triangles 57-59 are processed in the order indicated by the arrows to yield a triangle strip 56, conversion results from shared vertices can be reused so that fewer vertex conversions are required. This is illustrated by considering the process of first converting triangle 57 followed by converting triangle 58. The first triangle 57 includes three vertices 1, 2, and 3 which must be converted. Since it is the first triangle in the triangle strip 56, there can be no saving on the conversion of its vertices. However, when converting the second triangle 58, two of the vertices, specifically, vertex 2 and vertex 3, are the same as converted in triangle 57 and therefore do not need to be converted a second time. Thus, the conversion of the second triangle 58 only involves the conversion of one more vertex 4. Similarly, processing the next triangle 59 only involves the conversion of vertex 5. The processing of adjacent triangles can continue through the rest of the triangle strip 56 in a similar manner. As this figure illustrates, while the first triangle 57 requires the conversion of three vertices into pixels, subsequent triangles only require at most a single vertex conversion each.

The process of selecting triangles for conversion in order to form triangle strips 56 may also consider the vertex order in which the vertices are processed, sometimes referred to as the "winding order" of the vertex conversions. For example, in the first triangle 57, the indicated order of vertex conversion shown by the curved arrow is vertex 1 followed by vertex 2 followed by vertex 3. The second triangle 58 is converted in a similar order starting with vertex 2 continuing to vertex 3 and ending with vertex 4. Similarly, the next triangle 59 proceeds from vertex 3 to vertex 4 and finishing with vertex 5. By selecting triangles so that the vertex conversion winding order is properly aligned, conversion results from the two previous conversions can be maintained in buffer memory in the order they were processed in the preceding triangle, thus saving memory accessing and other processing. Some graphic pipeline implementations allow triangle vertices to be processed in any order. However, such flexibility comes at the price of processing speed and increased buffer memory requirements. Other graphic pipeline implements can only handle triangles in winding order, and thus must perform additional processing to switch the winding order when the next selected triangle must be processed in a different order. To switch the winding order, imaginary or "degenerate" triangles may be used to swap triangles. Swapping triangles by processing degenerate triangles comes at the price of additional processing steps which slows the graphics rendering process. Thus, the winding order of triangle strips is an important performance-related consideration in optimizing the formation of triangle strips for conversion.

Figure 8:
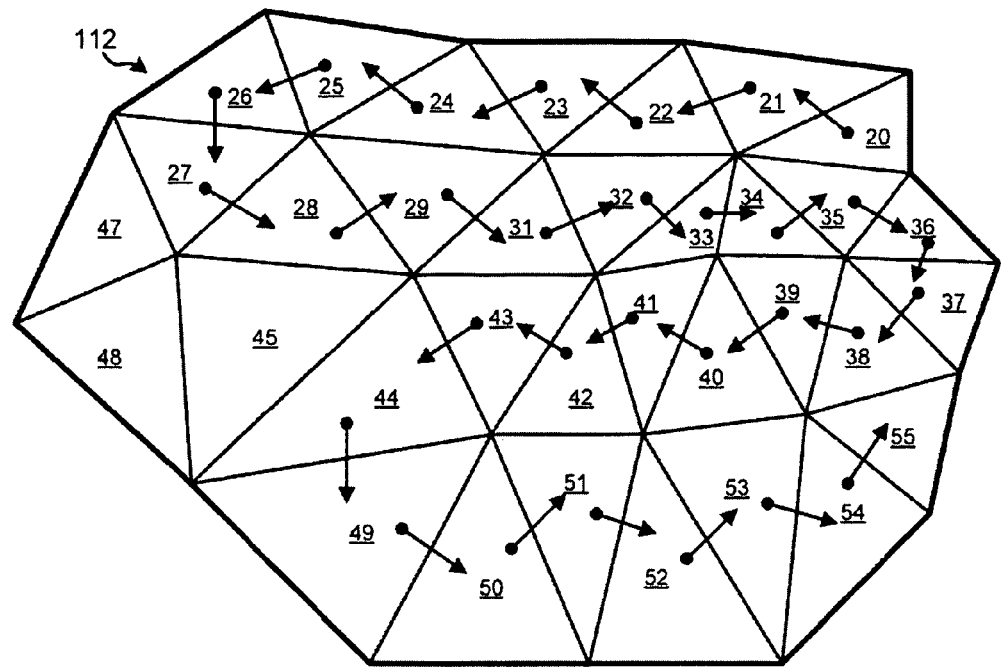
FIGS. 8-10 are illustrations of the simple object of FIG. 3 illustrating an order for processing triangles.
Figure 9:
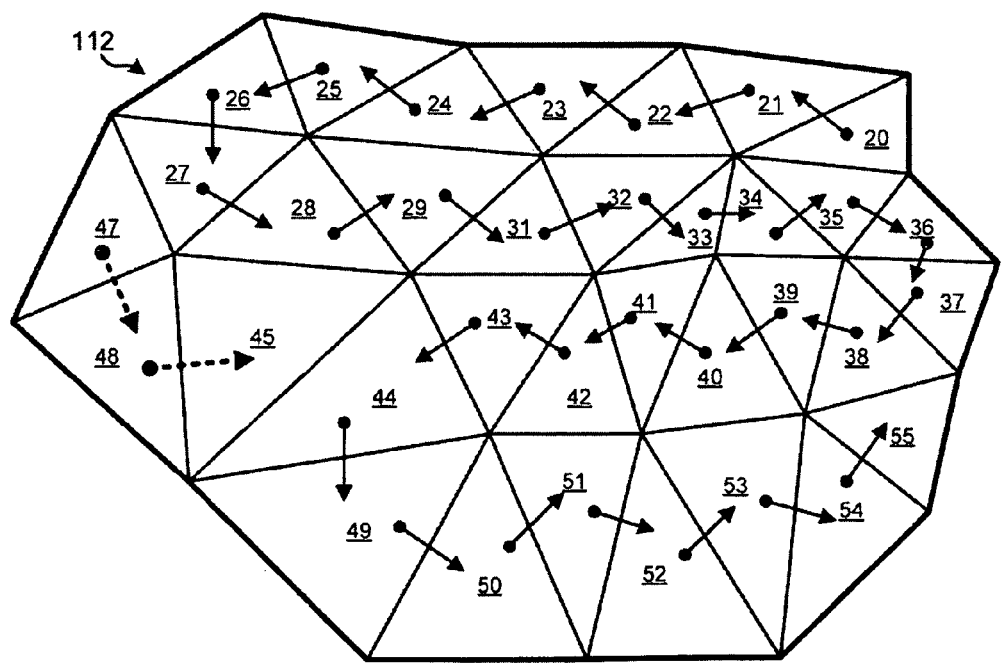

Complex graphic objects, such as the model object 112 illustrated in FIG. 8, involve of a large number of triangles which must be converted into pixels. In order to efficiently process such large objects, the modeled triangles are preferably selected for conversion in an order which results in a minimum number of triangle strips. This is because the first triangle in any triangle strip requires processing of three vertices. Thus, minimizing the number of triangle strips used to convert a particular object also minimizes the number of vertices which must be converted and improves processing performance. This is illustrated in FIG. 8 which shows one potential triangle strip proceeding from triangle 20 to triangle 55 indicated by the solid arrows. While the triangle strip proceeding from triangle 20 to triangle 55 encompasses a large number of triangles, it nevertheless leaves out three triangles 47, 48, 45. Thus, in order to fully process the modeled object 112, a second triangle strip must be used to encompass this left out triangles as illustrated in FIG. 9 indicated by the dashed arrows. It can be seen that the triangle strip paths implemented in FIG. 8 requires two triangle strips, which requires two "seed" triangles 20, 47. Thus, the triangle strip path illustrated in FIG. 8 is not optimum from the perspective of converting vertices into pixels.

Figure 10:
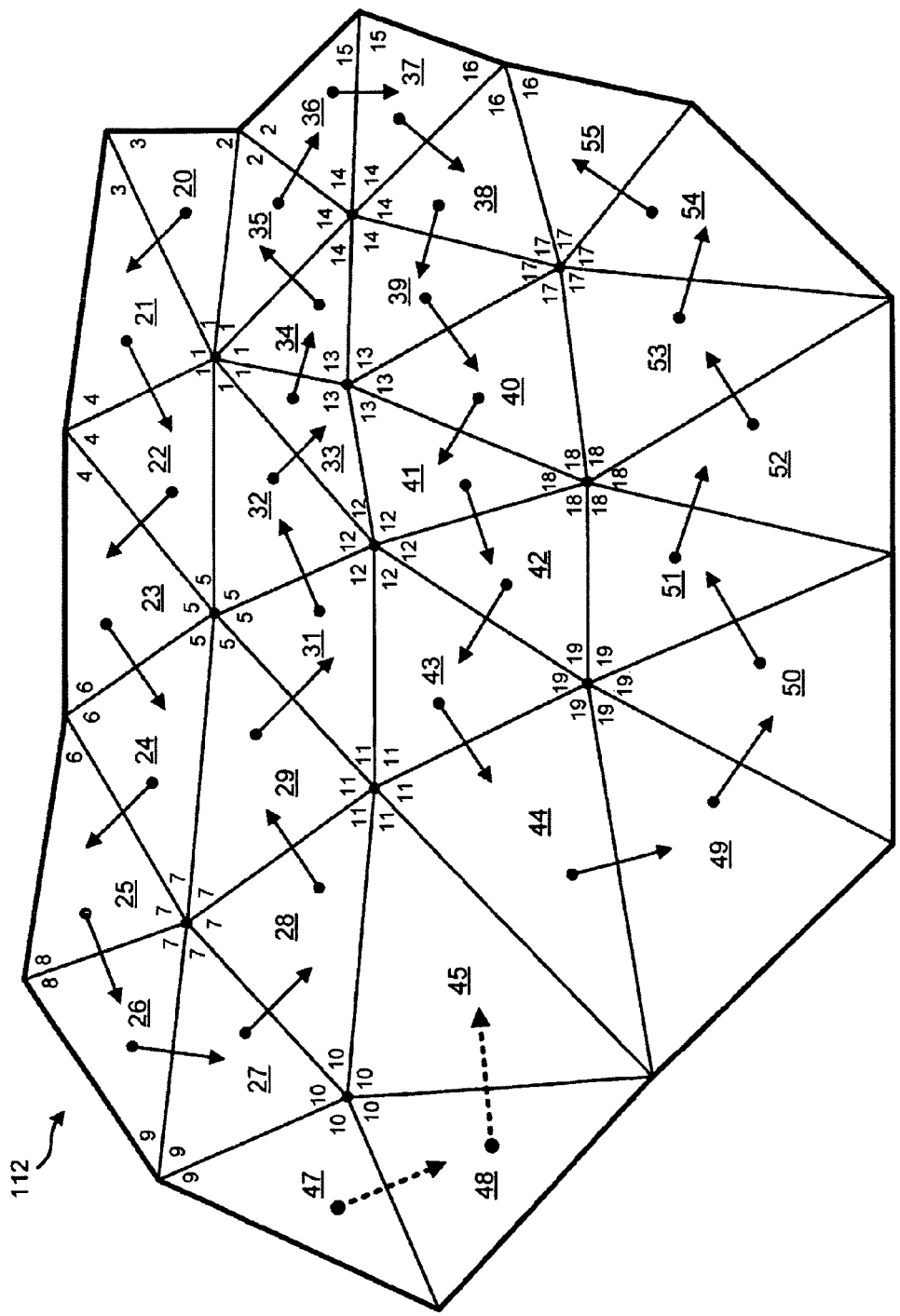

A further benefit of processing extended triangle strips can be seen by considering the illustration of the modeled object 112 in FIG. 10. This figure includes identifier numbers on the first 19 triangle vertices within the path illustrated by the solid arrows. As can be seen, processing extended triangle strips can result in the some vertex being used to several different times. By storing vertex conversion results in memory, such as a vertex cache memory, the processing results can be reused whenever a triangle strip returns to a previously processed vertex. For example, the first vertex 1 is reused in the processing of seven triangles 20, 21, 22, 32, 33, 34, 35. When the triangle processing path returns to a vertex already processed, the previous results can simply be recalled from memory so than no vertices need to be converted to process the associated triangle. This is illustrated in triangle 29 in which its vertices 5, 7, 11 have already been converted by the time processing of the triangle strip reaches that triangle. Consequently, vertices 5, 7 and 11 can be recalled from cache memory allowing triangle 29 to be processed without having to convert a single additional vertex. Similarly, after triangle 31 is processed, there is no need to convert any vertices to process triangle 32, since vertices to 1, 5, and 12 have already been converted with the results stored in cache memory. Similarly, when triangle 34 has been processed, no vertex conversions are needed to process triangle 35, since vertices 2, 1, and 14 have already been converted and stored in cache memory. A similar situation arises for triangles 39, 41 and 43 in the triangle strip illustrated by the black arrows. Thus, by properly forming triangle strips several triangles can be processed without requiring the conversion of any additional vertices. This can results in a significant savings in processing of modeled objects.

Figure 11:
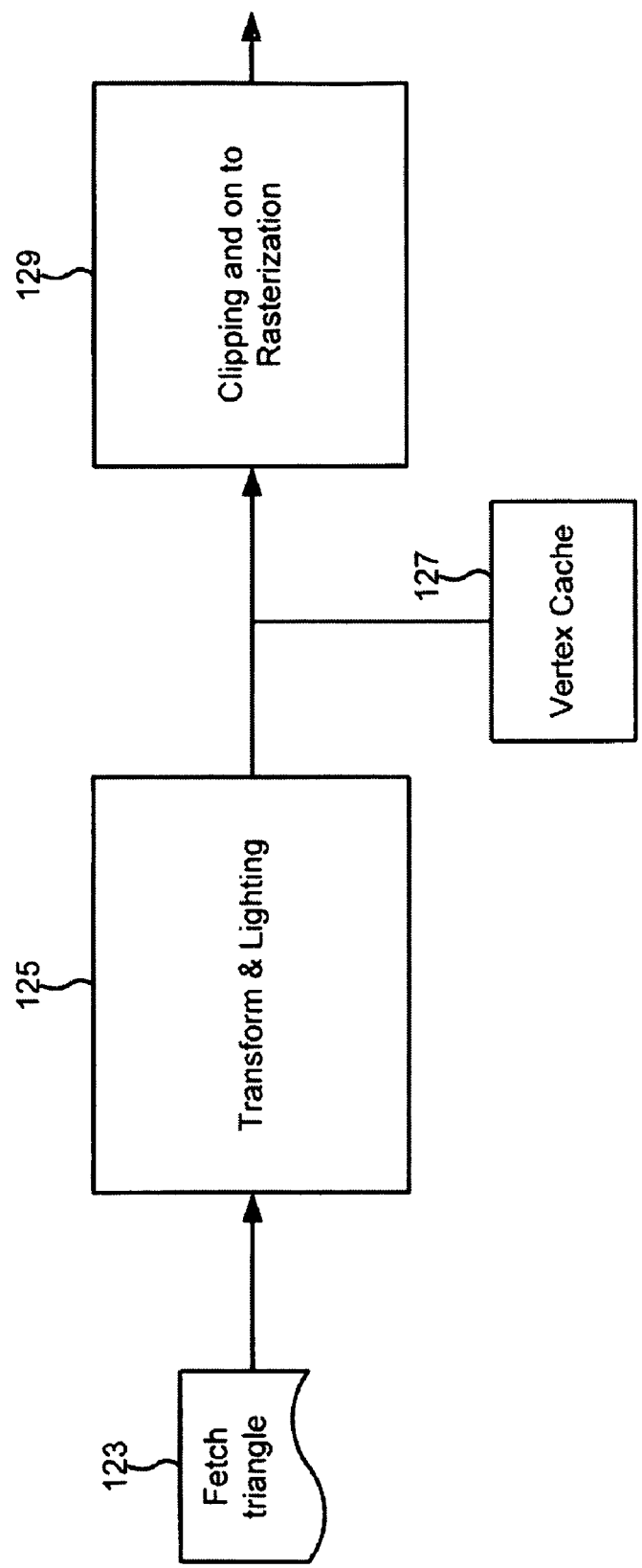
FIG. 11 is a block diagram of a portion of a graphics pipeline suitable for use with the various embodiments.

In order to enable efficient reuse of converted vertices, the graphics pipeline may be structured to include a vertex cache 127 as part of the graphics pipeline as illustrated in FIG. 11. The vertex cache 127 stores each converted vertex after the transformation circuit 125 prior to or in parallel with the results entering into the shader processing circuit 129. In this example architecture, triangles fetched from memory 123 are transformed in a transformation and lighting circuit 125. The 3-D transformation and lighting (or alternative vertex shader) processing converts each triangle vertex into a repositioned vertex in screen space in preparation for the rasterization stage. Processed information associated with each converted vertex is stored in the cache memory 127 before or in parallel with being sent to the shader circuit 129. Each converted vertex stored in the cache memory 127 can be accessed instead of performing a vertex transformation and conversion operation. In this way, vertex conversion results can be reused in the processing of triangle strips.

The transformation and conversion of triangle vertices involves complex mathematical transformations applied to a large number of coordinates associated with each vertex. FIG. 12 illustrates some of the data associated with each vertex organized in a data structure that may be implemented for storing vertex conversion results within the vertex cache memory 127. In order to enable rapid recall of cached conversion results, each vertex may be indexed (i.e., identified in memory with a vertex index 150). Each vertex has associated with it positional coordinates x,y,z, as well as color coordinates in terms of red, green and blue values, for example. Additionally, the orientation of the surface of a triangle in a modeled object 112 can be defined by a set of normal vectors $n_x$, $n_y$, $n_z$. Using the minimum set of positional coordinates 152, color values 154 and surface normal vectors 156, an object may be modeled in three dimensions and presented with proper prospective as an image on a display screen. Further realism can be provided by applying textures, shading and other visual processing to the various vertices. For example, texture coordinates 158 may provide information regarding shading and texture to enable the graphics system to apply shading and texture results to each vertex or the associated pixels. Such coordinates may identify the location on a texture surface stored elsewhere in memory that should be applied to the vertex. Other graphic processing effects may be applied by including additional factors associated with each vertex, such as other 160 factors a, b, c.

The data structure illustrated in FIG. 12 shows that there is a significant amount of data associated with each vertex. For example, in a typical computer graphics application, the positional coordinate values x, y, z are each 32 bit data elements, color coordinates may be 16, 32 and 16.16 bit data, and surface normal coordinates are typically 32 bit data each. In mobile devices, like cellular telephones, some of the coordinates may be 16 bit data elements. Even in such reduced format implementations it is clear from the data structure illustrated in FIG. 12 that storing a large number of vertices in cache memory requires a significant size cache.

Figure 13:
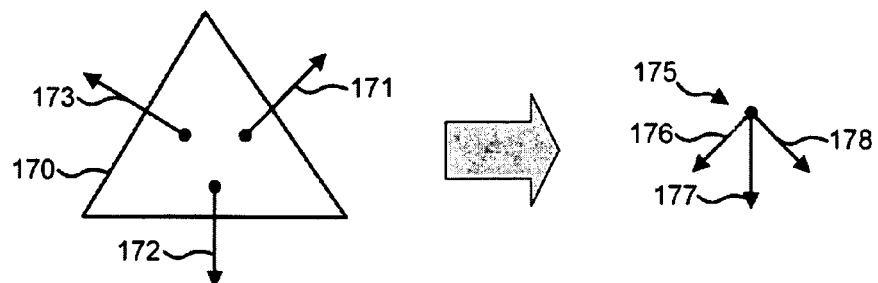
FIG. 13 illustrates a single triangle and the available paths that may be followed from that triangle.

As illustrated in FIG. 13, a first or "seed" triangle 170 considered in a mesh of triangles may lie adjacent to triangles on each of its three sides 171, 172, 173, thus presenting up to three possible directions in which to extend a triangle strip. Thus, the first triangle provides up to three possible path direction decision alternatives. These alternatives may be modeled as a simple game tree with the seed triangle 170 forming a decision node 175 having optional decisions or directions 176, 177, 178. Thus, the process of forming a triangle strip can be modeled as a series of game move decisions through a game tree of interconnected decision nodes.

Figure 14:
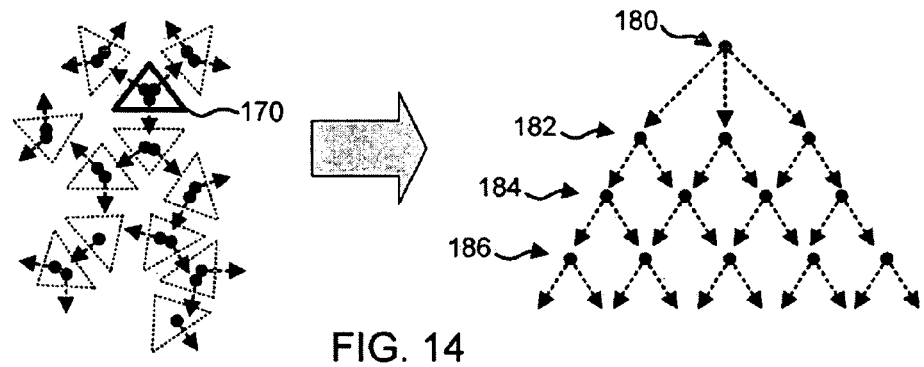
FIG. 14 illustrates a series of triangles with optional paths and how these paths can be structured as a decision tree.

After the seed triangle 170, subsequent triangles represent at most two alternative paths that can be followed as illustrated in FIG. 14. For example, the three triangles adjacent to a seed triangle 170 each present up to two alternative paths that may be followed. This branching of available alternative paths continues with each subsequent triangle, forming a game tree with a root node 180, and multiple layers of decision nodes 182, 184, 186. By analyzing triangle selection options in this manner game tree analysis can be applied to the process of selecting triangle for processing. Thus, the initial triangle 170 may be modeled as the top or root of the decision tree 180 as a first decision involving three alternative paths. Subsequent layers of decision nodes 182, 184, 186 each have at most two path alternatives (i.e., game choices). As illustrated in FIG. 14, such a game tree rapidly grows to a very large number of alternative paths the deeper the look-ahead.

Figure 15:
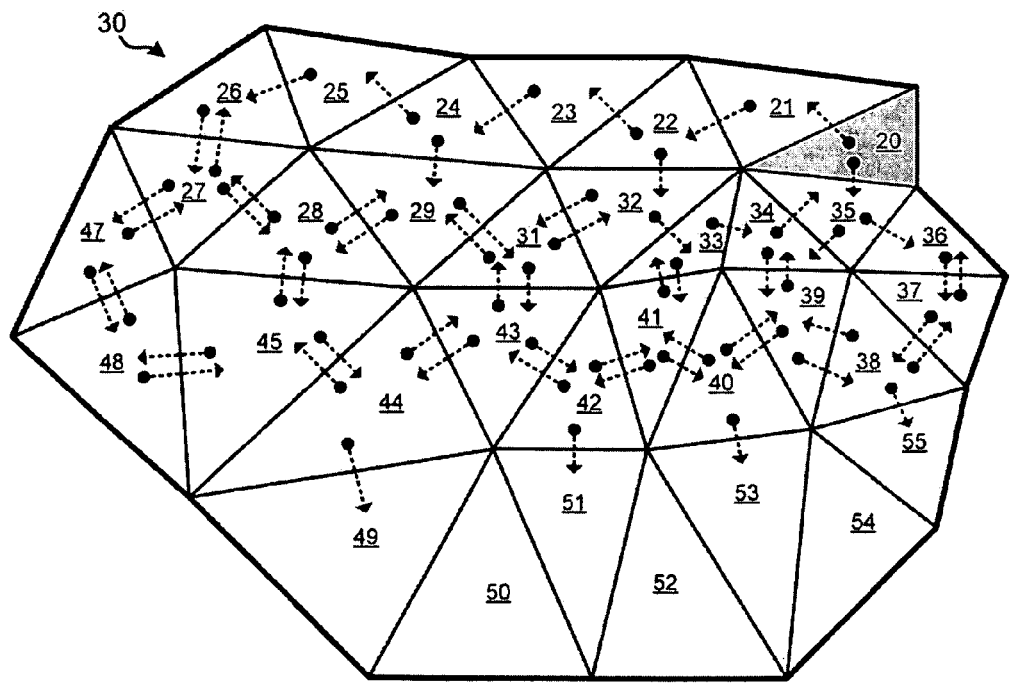
FIG. 15 illustrates the optional paths that may be implemented in the simple object illustrated in FIG. 3.

Selecting the starting or seed triangle can be important in forming an efficient triangle strip as it provides the starting point for the strip. For example, as illustrated in FIG. 15, if the starting triangle 20 is on the perimeter of the modeled object 112 there will be only two initial path alternatives to be evaluated. If an adjacent triangle is also on the periphery of the modeled object 12, that adjacent triangle may only a single subsequent path as illustrated in triangle 21. On the other hand, an adjacent triangle not on the object's perimeter will have two alternative paths, as illustrated in triangle 35. The large number of alternative paths that may be followed is illustrated in FIG. 15 by the dashed arrows showing the alternatives to/from one triangle to the next.

As the modeled object 112 in FIG. 15 reveals, even a relatively simple object presents a very large number of alternative paths for selecting triangles for processing in order to form triangle strips. Some paths will process through the graphics pipeline much more efficiently than others. Some paths will result in a dead-end requiring multiple triangle strips to be processed. The large number of path alternatives makes it very difficult for conventional graphics software and hardware to select an optimum path for processing. To address these challenges, the various embodiments employee game tree methods to evaluate alternatives paths to a predetermined depth and scoring mechanisms in order to select a best path for processing.

Figure 16:
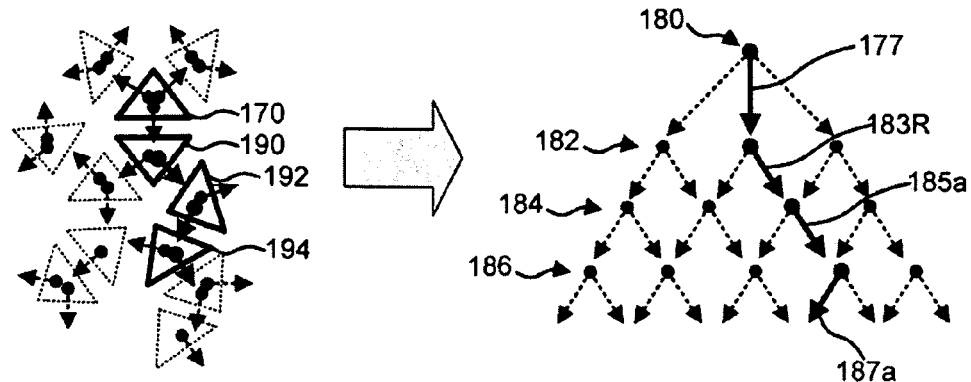
FIGS. 16-18 illustrate alternative paths through the series of triangles and decision tree illustrated in FIG. 14.
Figure 17:
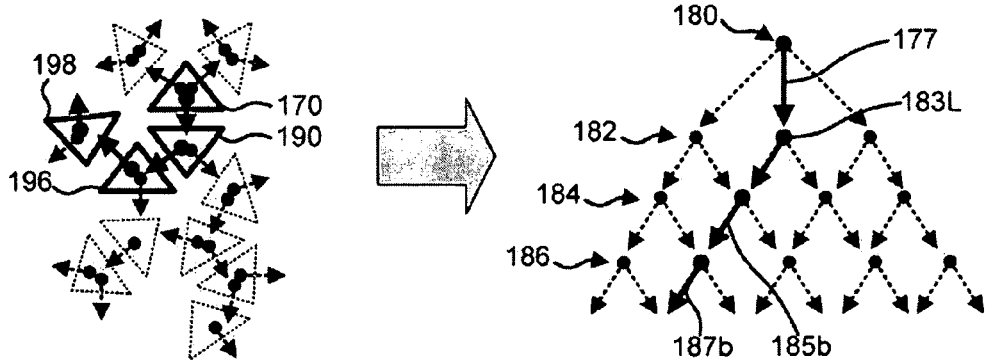
Figure 18:
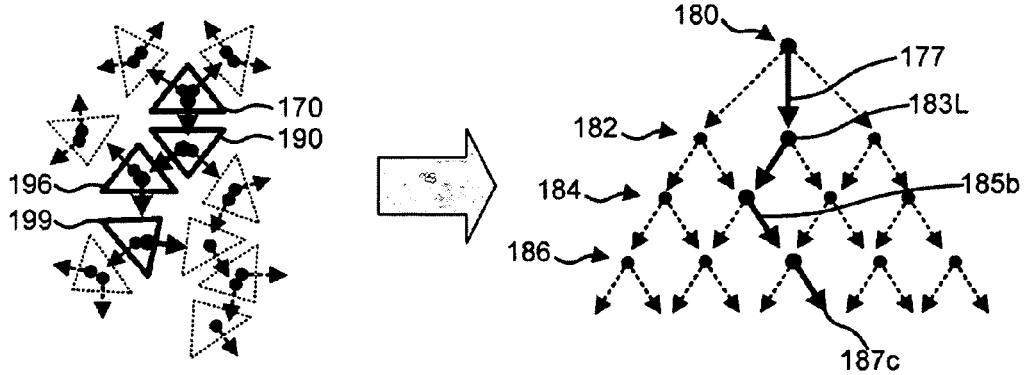

A simplistic illustration of the game tree analysis is provided in FIGS. 16 through 18. Referring to FIG. 16, starting with a seed triangle 170, a first alternative triangle 190 is selected for processing, which is illustrated as selected decision option 177 extending from the first decision node 180. Triangle 192 presents two alternative paths to adjacent triangles. The evaluation process proceeds by selecting one of the path options for evaluation, which is triangle 192 in FIG. 16, corresponding to game tree selection 183R. Similarly, triangle 192 presents two alternative path options, one of which (triangle 194) is selected corresponding to game tree selection 185*a*. Triangle 194 also has two alternative path options, one of which is selected corresponding to game tree selection 187*a*. Depending upon the selected triangles and the surrounding triangles, the selected path may have performance-related benefits or disadvantages. Such benefits and disadvantages may be scored by an evaluation criteria in order to yield a parameter for judging the relative merits of this particular path through triangles 170-190-192-194 (decision options 177-183R-185a-187a).

FIG. 17 illustrates the evaluation of an alternative path from triangle 170 through triangle 190. In this example, at the second level of decision nodes 182, triangle 196 is selected corresponding to the game tree selection 183L. Triangle 196 presents two options, of which triangle 198 is selected, corresponding to the game tree selection 185b. Finally, from triangle 198 there are two alternative paths, one of which is selected corresponding to game tree selection 187b. As result, a different path through five triangles is evaluated with a different performance-related scored determined.

FIG. 18 illustrates yet a third alternative path that may be followed. In this example, the path encompasses triangles 170, 190, 196 and 199, which may have a different performance-related score than the paths illustrated in FIGS. 16 and 17.

Figure 19:
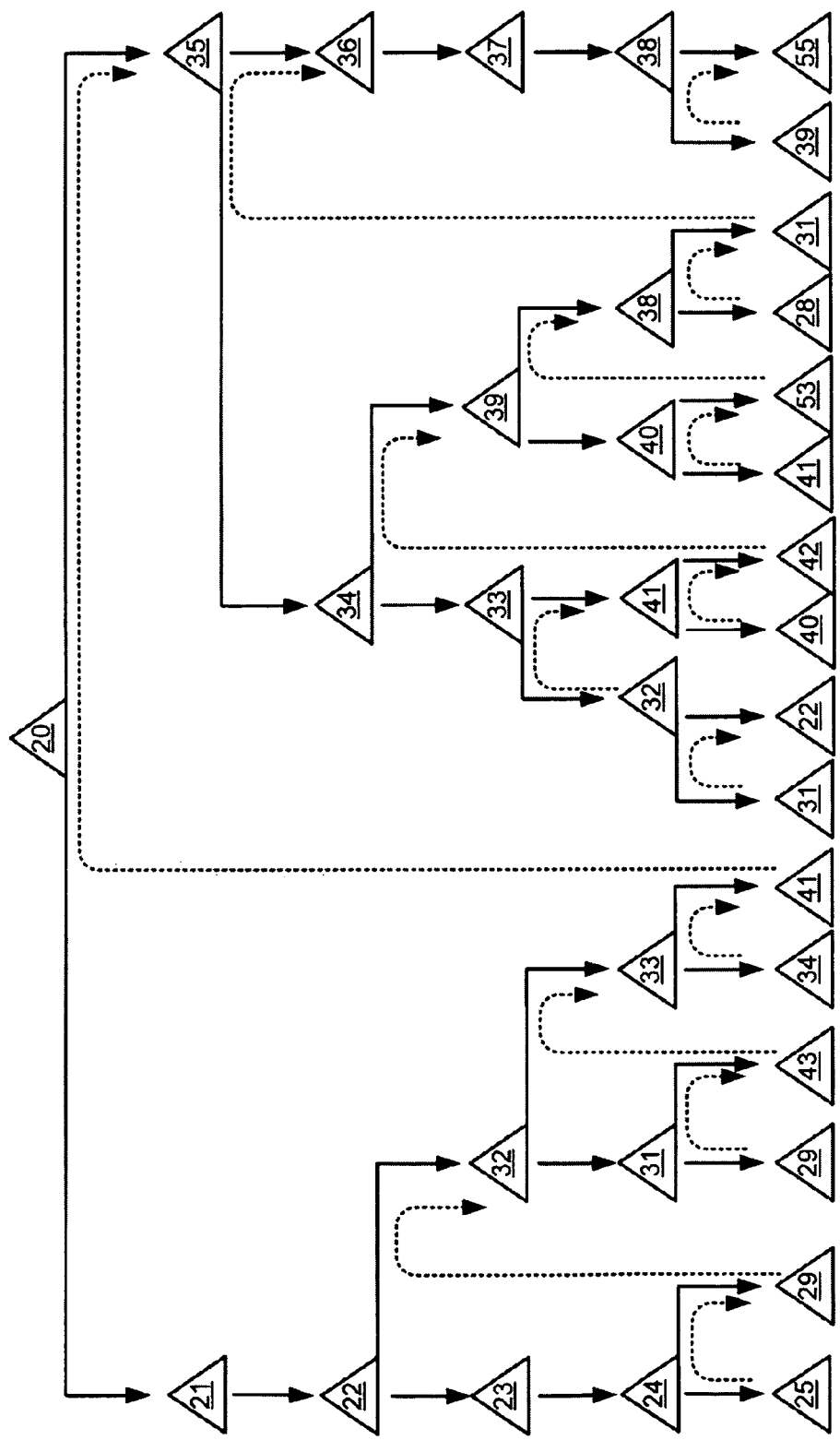
FIG. 19 illustrates processing of a decision tree of the object illustrated in FIG. 15.

The evaluation of alternative paths within a game tree can be made efficient using a memory stack cache, such as described below with reference to FIGS. 22A-D. As illustrated in FIG. 19, the evaluations alternative triangle strip paths can proceed down each leg of a decision tree until the maximum evaluation depth is reached (or a dead end is reached or no more triangles are available) and then proceed back up through the decision tree to proceed back down the next available (i.e., not yet processed) alternative path. Such up and down processing of a game tree can be facilitated using a memory stack type of data organization. For example, FIG. 19 illustrates the game tree of alternative paths for the modeled object 112 illustrated in FIG. 15 extending from the seed triangle 20 down to a depth of five decision nodes. To evaluate each of the various alternative paths extending from triangle 20, the evaluation process may proceed by selecting a first alternative path (such as the left branch to triangle 21) and following it through various alternatives to paths available until the evaluation depth limit (or some other endpoint) is reached. Thus, the evaluation process may move from triangle 20 to triangle 21. Triangle 21 having a side adjacent to an exterior of the modeled object 112 has only one subsequent path that can be followed to triangle 22. Thus, there is no decision on among alternative paths to be made for triangle 21. Moving to triangle 22, there are two alternative paths that can be followed to either triangle 23 or triangle 32. Selecting one of those paths, namely triangle 23, it is observed that triangle 23 only has a single subsequent path available to triangle 24. Moving on to triangle 24, there are two alternative paths that can be followed to either triangle 25 or triangle 20. Selecting triangle 25 the look-ahead evaluation process may reach its maximum evaluation depth. This maximum look-ahead of five decision nodes is for illustrative purposes only; in use, the maximum evaluation depth may extend well beyond five decision nodes. Having evaluated the path of triangle 20 to 21 to 22 to 23 to 24 to 25, the process can calculate a score for this path according to various performance-related evaluation criteria described in more detail below.

Once the score for the path is stored in memory, the process may move back up the decision tree one decision node to triangle 24 (illustrated by the dashed arrow) by removing the score for triangle 25 from the stack (the score is "popped off" the top of the stack). From triangle 24, the alternative path to triangle 29 can be evaluated. Again, triangle 29 is at the maximum depth of evaluation in this example and so another path score may be calculated for the triangle strip path proceeding from triangle 20 through triangle 24 to triangle 29. This path score may then be stored in memory before moving to the next alternative.

Once the path through triangle 29 is evaluated, the score for triangle 29 is removed from the stack bringing the process up to triangle 24. Since there are no all other alternative paths for triangle 24, the score for triangle 24 is also removed from the stack to bring the process up to triangle 23. Since triangle 23 has no other alternative paths to evaluate, its score is also removed from the stack bringing the process back up to triangle 22. From triangle 22, the alternative path to triangle 32 can be evaluated. This upward movement of the evaluation by popping values off the evaluation stack is illustrated in FIG. 19 with dashed arrows.

Evaluating triangle 32 when approached from triangle 22 there are two alternative paths that can be followed to triangles 31 and 33. Selecting one of one of these paths, namely triangle 31, it is found that triangle 31 presents two alternative paths that can be followed to triangles 29 and 43. It is noted that in this circumstance triangle 29 is part of a different path from triangle 20 when approached from triangle 31 compared to the path from triangle 20 when it is approached from triangle 24. Selecting triangle 29, the process has again reached the maximum depth of evaluation so a score for the path through triangles 20-22-32-31-29 is calculated and stored in memory. The score from triangle 29 is then popped off the stack memory to move up to triangle 31 from which the alternative path to triangle 43 can be evaluated. Again, with triangle 43 being at the maximum depth of evaluation, a score for the path from triangle 20 through to triangle 43 is determined and stored in memory.

This evaluation process continues with the triangle scores being removed from the stack memory in order to move up to a previously evaluated triangle which has another alternative path yet to evaluate, and triangle scores pushed onto the stack in order to move down the decision tree. Thus, the results from triangle 43 and 31 are removed from memory to bring the process up to triangle 32 in order to evaluate the alternative path to triangle 33. Similarly, the alternative paths from triangle 32 to triangle 33 to triangles 34 and 41 are evaluated in turn with their respective results stored in memory. Finally, when triangle 41 results are stored in memory, the triangle values are removed from stack memory sequentially, moving up the stack until a triangle with an alternative path available is reached, which is the top triangle 20 in the example illustrated in FIG. 19. Since there are no other paths to be evaluated on the left hand branch of paths extending from triangle 20, the processing can move to the right-hand branch of paths to evaluate the path to triangle 35. Processing of the paths from triangle 20 through triangle 35 are then processed in a very similar manner until all alternative paths have been evaluated to the maximum depth.

Results of the alternative paths extending from triangle 20 illustrated in FIG. 19 will yield 16 separate evaluation scores that can be used to compare the various paths from triangle 20 to a depth of five triangle selections. These alternative path score values may be compared in order to identify a single alternative best path according to the criteria used in calculating to score. The path with the best score indicates a best path through five moves of the game tree illustrated in FIG. 19. However, this best score would not necessarily identify the optimal path to follow through the entire modeled object 112 which consists of 35 triangles. In order to determine the truly optimal path through the entire modeled object, the evaluation process would have to proceed to a maximum depth of 35 layers in order to calculate all alternative paths available from triangle 20. However, as FIG. 19 reveals, the number of available paths grows exponentially with each evaluation layer. Consequently, for all but the most simplistic model objects, it may be impractical to evaluate all triangle paths within objects prior to selecting triangles for processing. Nevertheless, partial evaluation of paths to a predetermined depth of evaluation can be used to work through the object incrementally using the look-ahead methodology.

In a first alternative, the path which has the highest evaluated score may be used to make only the first path step selection, i.e. the move from triangle 20 illustrated in FIG. 19. Thus, if the highest score is associated with the path from triangle 20 through to triangle 25, that score result may be used to choose triangle 21 as the next triangle for processing. Since triangle 21 presents only a single subsequent path, the next triangle 22 may also be selected for processing.

When that selection is made, the evaluation process can be conducted again to look-ahead five more moves extending from triangle 22. As above, the process would proceed down each of alternative paths available from triangle 22 (i.e., to either triangle 23 or triangle 32) to the maximum depth of evaluation in order to calculate a path with a highest evaluated score. That evaluated score would then be used to make the next alternative path selection. In this manner, the look-ahead algorithm can be used to incrementally move through the modeled object looking ahead a few number of moves each time a choice needs to be made between one of two alternative paths from a transformed triangle.

In an alternative approach, the look-ahead model evaluation process can be used to follow the path with the highest evaluated score to more than one triangle. Since the path beyond the maximum depth of evaluation is not considered in the path evaluation score, the number of triangles that should be processed should be some fraction of the maximum evaluation depth. For example, considering the paths illustrated in FIG. 19, if the path from triangle 20 to triangle 25 had the highest evaluated score through five decision layers, three triangles in the path could be selected for processing, and thus moving from triangle 20 through to triangle 23 without repeating the look-ahead evaluation process. However, triangle 23 has only one available path to triangle 24, so triangle 24 would be promptly selected and the look-ahead evaluation process would not be repeated until triangle 24 is reached. Upon reaching triangle 24 the look-ahead evaluation process may be repeated in a manner very similar that described above with triangle 24 at the top of the decision tree.

Figure 20:
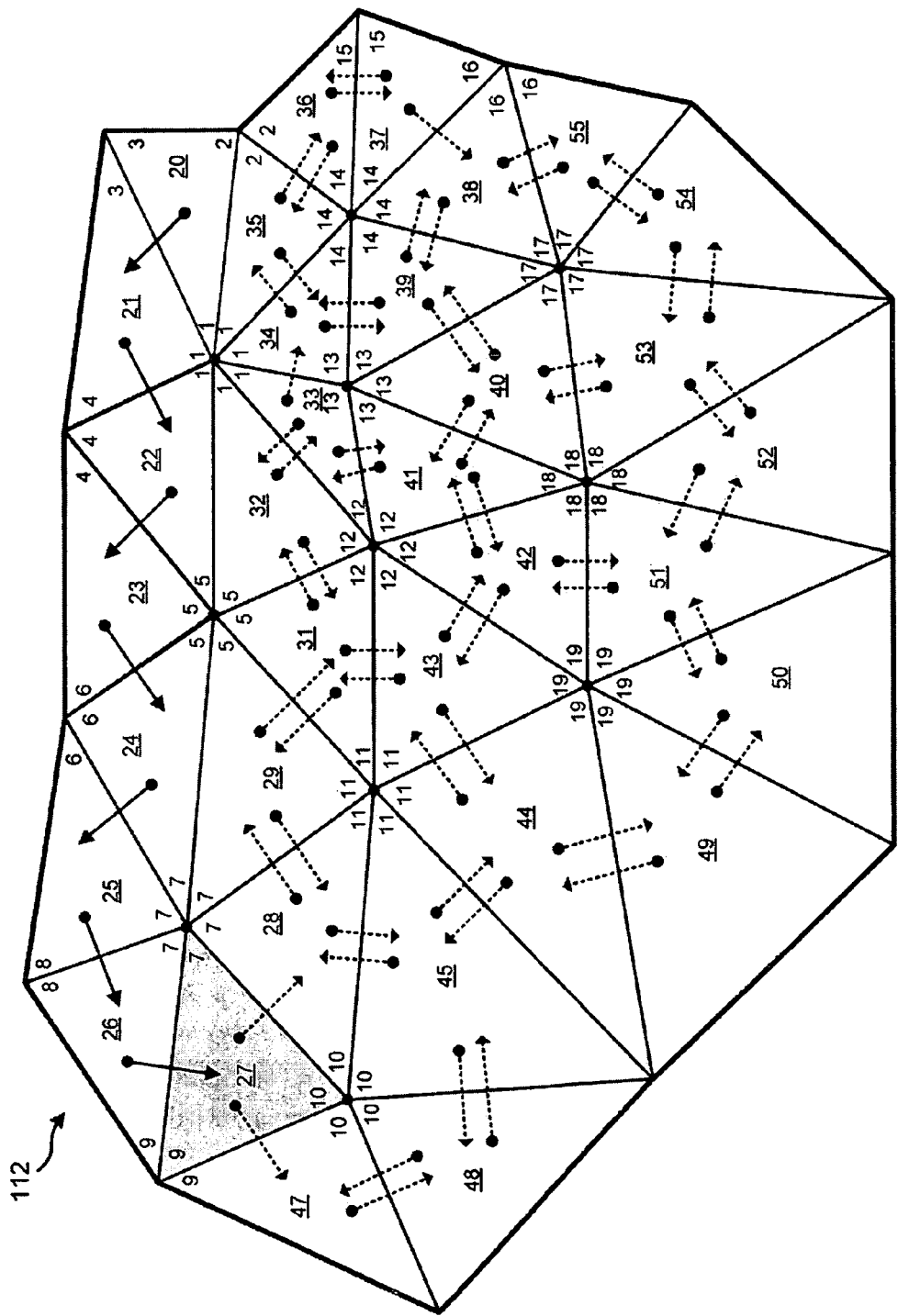
FIG. 20 illustrates the optional paths that may be implemented in the simple object illustrated in FIG. 3 after eight triangles have been processed.

In many circumstances the relative performance of alternative paths may not be well revealed until several layers of triangles have been considered or processed. In use, the scores through the five layers of alternative paths illustrated in FIG. 19 may yield very similar path scores. It may not be until further in the processing of the object that the benefits or weaknesses of a selected path are revealed. This is illustrated in FIG. 20 which shows that the modeled object 112 after eight triangles have been transformed and converted, with the process starting at triangle 27 which has alternative paths to either triangle 47 or triangle 28. As illustrated by the solid arrows, the modeled object has already proceeded to select eight triangles, which reduces the number of alternative paths, illustrated with dashed arrows, that remained to be evaluated.

Figure 21:
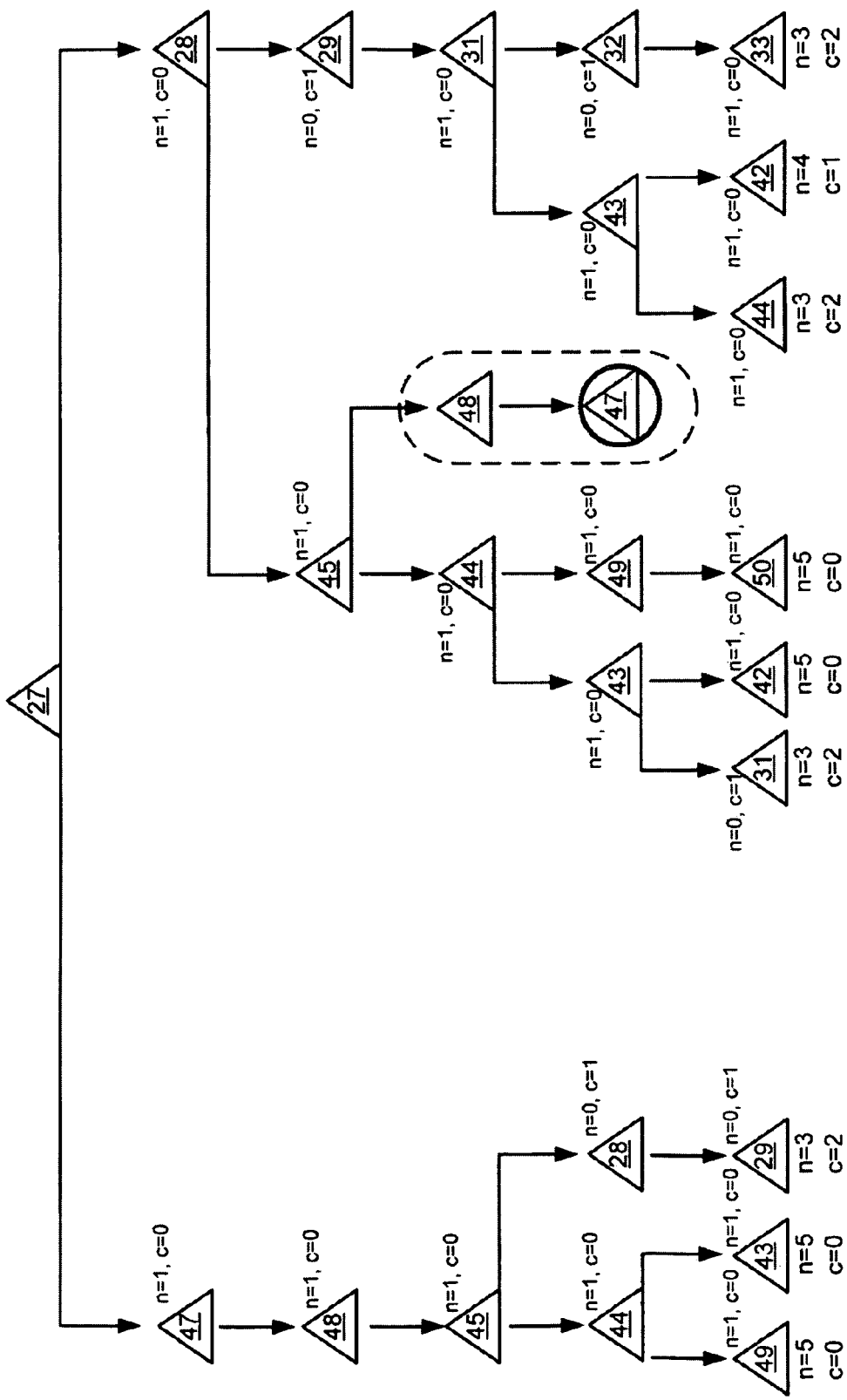
FIG. 21 illustrates processing of a decision tree of the object illustrated in FIG. 20.

The decision tree extending from triangle 27 in this example situation is illustrated in FIG. 21. After triangles 20 to 26 have already been processed, the decision tree appears very different from that illustrated in FIG. 19 since several triangle paths are not available and several vertices have already been converted with the results stored in cache.

The decision tree illustrated in FIG. 20 also illustrates an example of two performance-related criteria applied to alternative paths to generate score values for the alternative paths. The first performance-related criteria is the number of vertices "n" that are converted when processing a triangle within a path. The second criteria is the number of times "c" the cache is utilized in order to process a triangle. In this simple example, if a cache recall is used to process a triangle then there is no need to convert a new vertex. This example assumes that the previous two vertices in the preceding triangle are retained for processing the next triangle and not pulled from cache in the processing of triangles so only the third vertex in a triangle needs to be either converted or recalled from cache. For example, following the path from triangle 27 to triangle 47 only one new vertex needs to be converted since two of the vertices are common to triangle 27 (namely vertices 9 and 10). Similarly, the path leading from triangle 47 through triangles 48, 45, 44 and 49 requires converting one new vertex to process each triangle. Thus, the total number of vertices converted in the path from triangle 27 through 49 equals five (i.e., n=5). Similarly, since none of the vertices in this path were available in cache (not counting the two vertices that would be processed in the preceding triangle) the number of cache hits in this path equals zero (i.e., c=5). Moving back up to triangle 44, the alternative path to triangle 43 results in the same score (i.e., n=5 and c=5).

In contrast, the evaluation of the alternative path from triangle 45 to triangle 28 and then to triangle 29 (there is only one alternative path available from triangle 28 in this example) yields a different evaluated score. When triangle 28 is evaluated in the path proceeding from triangle 45, no new vertex conversions is required since vertex 7 can be recalled from cache memory. Specifically, vertex 7 was previously processed when triangle 24 was processed in the triangle strip leading to triangle 27 (see FIG. 20). Thus, the path from triangle 27 to 47 to 48 to 45 and then to triangle 28 requires no additional vertex processing for triangle 28. Similarly, when triangle 29 is reached in this path processing of the triangle will not require the conversion of any vertices since vertex 5 was processed previously when triangle 22 was processed in the triangle strip leading to triangle 27 (see FIG. 20). Thus, the score for the path from triangle 27 to triangle 29 yields an evaluated score based on three new vertex conversions and two cache hits (i.e., n=3 and c=2). Since the use of cached vertex results and minimizing the number of vertices converted may be associated with increased performance, this score may indicate that this path is preferred over the paths through to triangles 43 and 49 discussed above.

The use of stack memory processes in the evaluation of alternative triangle strip paths is illustrated in FIGS. 22A-22D. These figures illustrate a portion of computer memory 300 including a triangle index stack 302 and a triangle metric score stack 304. As is well known in the computer arts, a stack memory is a type of data structure in which data is stored in order and can be accessed in inverse order from that in which the data is added ("pushed") to the stack memory. Thus, data is "stacked" in the memory segment with only data on the "top" of the stack accessible to applications.

Figure 22A:
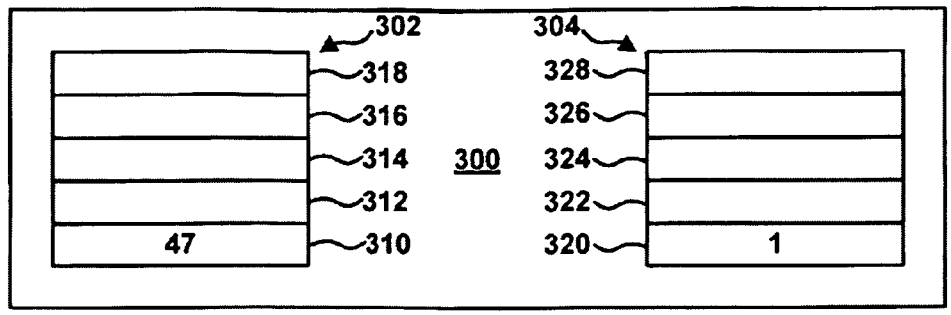
FIGS. 22A-22D illustrate stack memory data structures useful in processing the decision tree illustrated in FIG. 21.
Figure 22B:
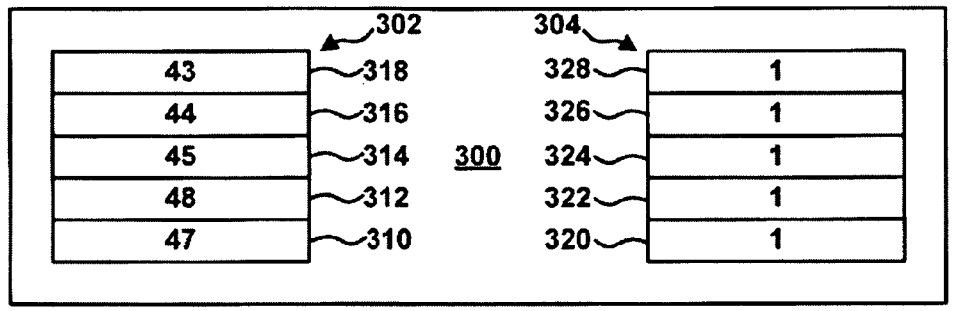
Figure 22C:
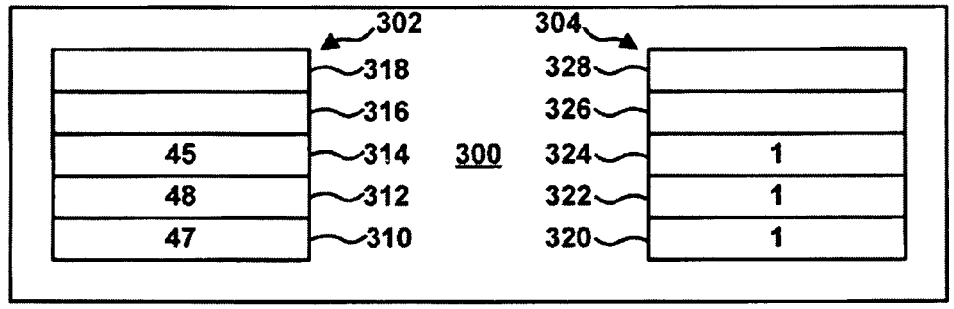
Figure 22D:
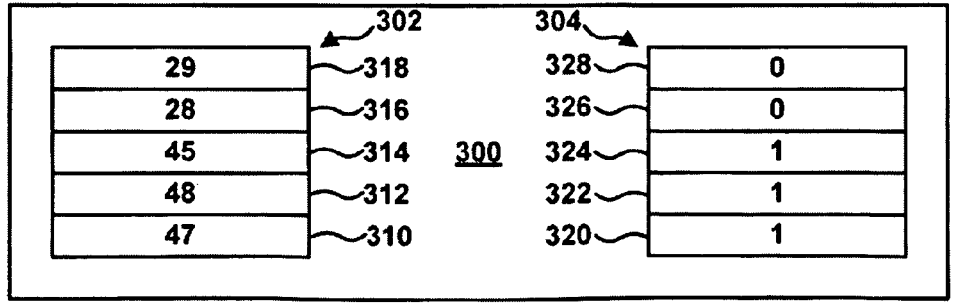

As each triangle in a path is evaluated, the triangle's identifier or index may be stored in a triangle index stack 302 and the metric calculated for that triangle may be stored in a metric score stack 304. FIG. 22A illustrates the index stack 302 and metric score stack 304 after the first step of evaluating triangle 47 from triangle 27. For this example, the metric calculation is the number of vertices that need to be converted to process the triangle (the "n" values shown in FIG. 21). This process of adding indices and scores to stack memory continues for subsequently evaluated triangles until a dead end or the maximum depth of evaluation is reached. An example of this is illustrated in FIG. 22B which shows the stack memories 302, 304 when the evaluation process has reached triangle 43 via the path from triangle 27 illustrated in FIG. 21. As illustrated in FIG. 21, the results of each triangle evaluation in the path is stored in order, so the triangle 43 identifier ("43" in FIG. 22A) and metric score of "1" are on the top of the respective stacks 302, 304. Since in this example, the maximum depth of analysis of five layers has been reached, the score for the path is quickly calculated by totaling the values in the metric score stack 304. In this example the score for the path is 5.

As described above, to move up to triangle 45 to evaluate the other path alternative to triangle 28 the triangle indices and metric score values for triangles 43 and 44 are "popped" off the respective stacks 302, 304. This results in the stack memory state illustrated in FIG. 22C. To move down to evaluate the alternative path, the index for triangle 28 is "pushed" onto the index stack 302 and its metric score (in this example 0 because no indices need to be converted for this triangle and path) is pushed onto the metric score stack 304. Similarly the index for triangle 29 is pushed onto the index stack 302 and its metric score (in this example 0 because no indices need to be converted for this triangle and path) is pushed onto the metric score stack 304. This results in the stack memory state illustrated in FIG. 22D. Again, the score for the path is quickly calculated by totaling the values in the metric score stack 304. In this example the score is 3.

Returning to FIG. 21, evaluation of the right-hand branch from triangle 27 shows how some paths may result in undesirable outcomes which can be very useful in making selections among alternative path choices. For example, when the path from triangle 27 to 28 to 45 is evaluated the results are very similar at the second-level of valuation as on the left-hand branch of the decision tree at the same level. However, when the option from triangle 45 to triangle 48 is evaluated there is only one alternative path available to triangle 47 from which there are no further triangles which have not already been evaluated. Thus, the path from triangle 45 to triangle 48 results in a dead end which leaves unevaluated most of the triangles in the modeled object 112. Therefore the evaluation criteria resolve to a lower score for the evaluation of this path causing an alternative path to be selected.

An alternative path from triangle 45 to triangle 44 may be followed. As noted in FIG. 21, some options following this path result in higher value scores, such as the path from triangle 44 to triangle 31 which features two cache hits and only three new vertices converted. However, an inspection of FIG. 20 reveals that the selection of triangle 45 from triangle 28 has negative consequences ahead as triangles 47 and 48 will end up being isolated when the dead end is avoided by selecting triangle 44 to extend the triangle strip through most of the modeled object 112. Thus, the fact that a dead end appears in one decision branch (i.e. the decision from path to triangle 28 when approach from triangle 27) may be used to assign a low value to the alternative path from triangle 20 to triangle 45. Various scoring rules may be utilized as performance-related criteria in order to enable making path selections based upon inferences available when some paths along a particular branch yields undesirable score values as illustrated in FIG. 21. For example, if such performance-related criteria are utilized, the path from triangle 27 to triangle 47 may be selected even though the path through triangle 28 yields three alternative paths with scores as high as the path available through triangles 47-48-45-28-29. The various embodiments need not follow paths based strictly up on the evaluated score within a particular branch, and may make decisions based upon the total or, average or minimum score than that it is achieved along one branch versus another. Thus, FIG. 21 illustrates how a minimal look ahead of just five triangle moves can be used to navigate triangle strips through a complex mesh of triangles to identify high performance paths.

As the processing of triangles proceeds through modeled objects, an increasing number of vertices that have previously converted may be available in cache memory. In these previous lead process of vertices of us can be leveraged to identify efficient paths through the modeled object looking ahead only four to five levels.

In practice, the evaluation of alternative paths may proceed to a deeper level of evaluation than illustrated in FIGS. 19 and 21 as the associated index and score values can easily be stored in stack memory and processed very quickly. In evaluating triangles in a look-ahead algorithm, very few data points may need to be considered for each triangle. For example, only the alternative paths available and the number of new vertices that must be converted may need to be stored in a stack memory as illustrated in FIGS. 22A-22D. Thus the information considered in evaluating triangles in a look-ahead algorithm may be limited to simply a triangle identifier, a path alternative identifier and one or a few performance-related scores for each triangle.

Figure 23A:
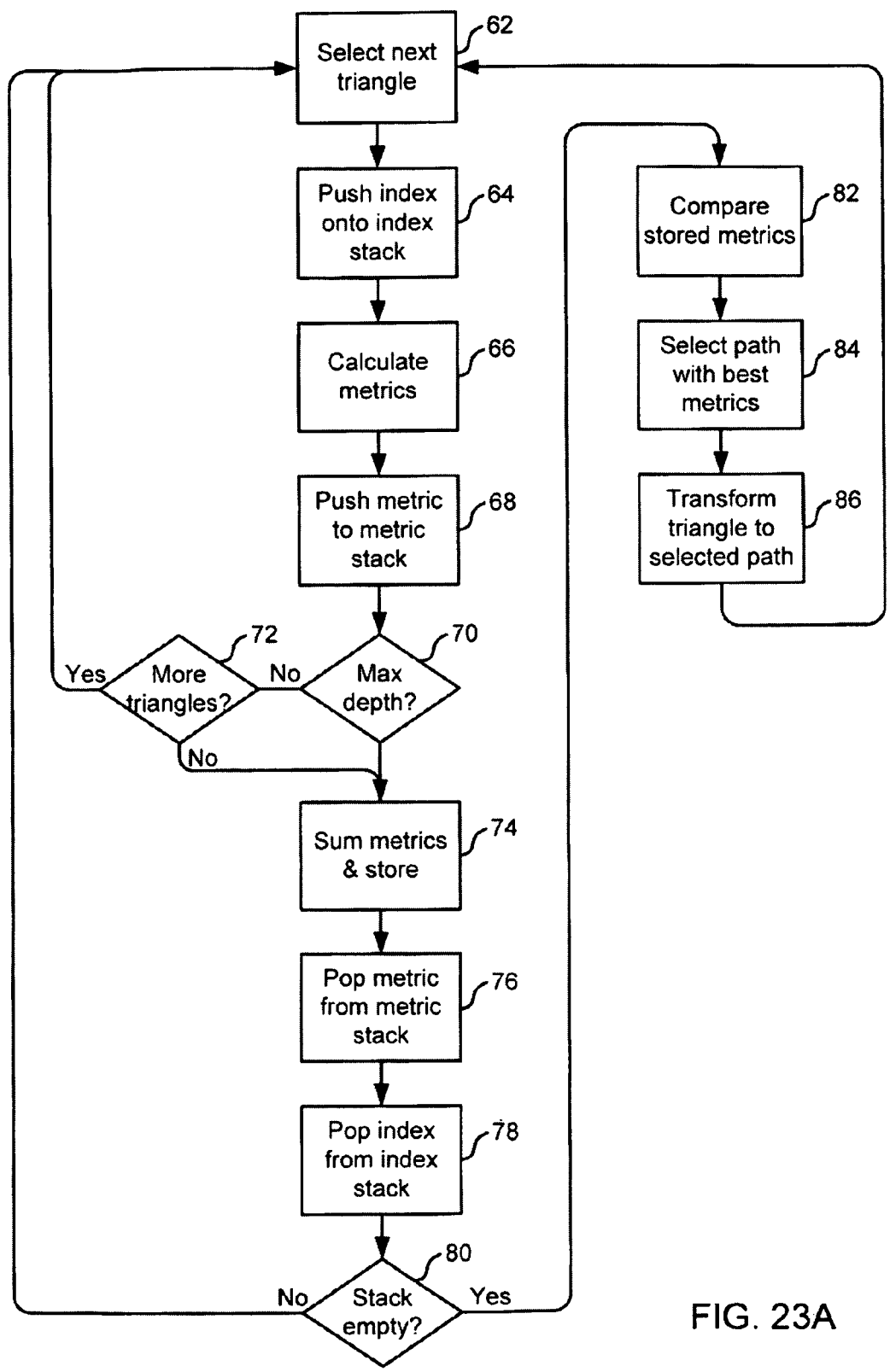
FIGS. 23A and 23B are process flow diagrams of method steps that may be implemented according to alternative embodiments.

The look-ahead path evaluation method of the various embodiments may be implemented in software or hardware using well-known recursive programming methods. An example of method steps that may be implemented to evaluate triangle paths in a look-ahead algorithm are illustrated in FIG. 23A. Starting from a particular root triangle (which may be the seed triangle in a modeled object or the last converted triangle), the algorithm selects the next triangle for evaluation, step 62. If there is only one not-yet-processed triangle adjacent to the root triangle, that available triangle is selected. However, if the root triangle has two alternative paths available (i.e., two adjacent triangles which have not been evaluated), one of those paths is selected in this step 62. If the root triangle is also the seed triangle, a selection among three alternative paths may need to be made. An identifier (e.g., an index or similar value) for the selected triangle may then be stored in a triangle index stack (e.g., stack 302 illustrated in FIG. 22A), step 64. The evaluation criterion or criteria are then applying to the triangle to calculate a metric score associated with the selected triangle, step 66. This scoring metric may be as simple as storing the number of vertices that would have to be converted if this triangle were processed next. In other implementations, rules of selection or more complex evaluation criteria may be applied to the triangle being evaluated to generate the score value. Further, the metric may be specified by users. In this manner, the process can be fully configurable by users in order to enable optimization of triangle selection based upon the hardware and software in use and the programmer's objectives. The calculated metric score can be pushed onto a metric score stack 304 or otherwise stored in memory, step 68.

With the metric score calculated for the selected triangle and stored in stack memory of (steps 64 through 68), the process may determine whether there are additional triangles to be evaluated. To do this, the process may determine whether the maximum depth of evaluation has been reached, test 70. If the maximum depth has not been reached (i.e. test 70="No"), then the process may determine whether there are additional triangles which can be evaluated, test 72. This test determines whether or not there are any triangles adjacent to the selected triangle (i.e., share a common side) which have not yet been evaluated or converted. If the modeled object has not already been completely evaluated or converted, and the triangle is not at a dead end, then the answer to test 72 will be "Yes" and the next triangle will be selected by returning to step 62. However, if the selected triangle is a dead end or the adjoining triangle(s) have already been evaluated or converted, then the result of test 72 is negative. If either the maximum depth i.e. has been reached (i.e., test 70="Yes") or the selected triangle is a dead end (i.e., test 72="No"), then the sum of the metrics in the metric stack memory are totaled to yield a path score and the result stored in memory associated with the path of triangles indicated in the index stack, step 74. Thus, the path resulting from a first triangle to the last evaluated triangle indicated by either the maximum depth or a dead end condition is stored in memory, step 74.

At this point, the process can move back up the decision tree by removing the last metric value stored in the metric score stack, step 76, and removing the last selected triangle from the triangle index stack 302, step 78. If the triangle index stack 302 is not empty, test 80, the processor will select the next triangle by returning to step 62. However, if the index stack is empty (i.e., test 80="Yes") then all paths possible from the root triangle have been evaluated, and the process compare the path scores, step 82, in order to identify the best alternative path. Using the best alternative path score, the process can select one of the alternative paths from the root triangle, i.e., one of the adjacent triangles, step 84. Finally, the triangle in the selected path is called from memory and is transformed in converted as described above, step 86. With that triangle converted, the process of selecting the next triangle for conversion can be repeated by using the converted triangle as the root triangle and repeating the step of selecting the next triangle for evaluation by returning to step 62.

Figure 23B:
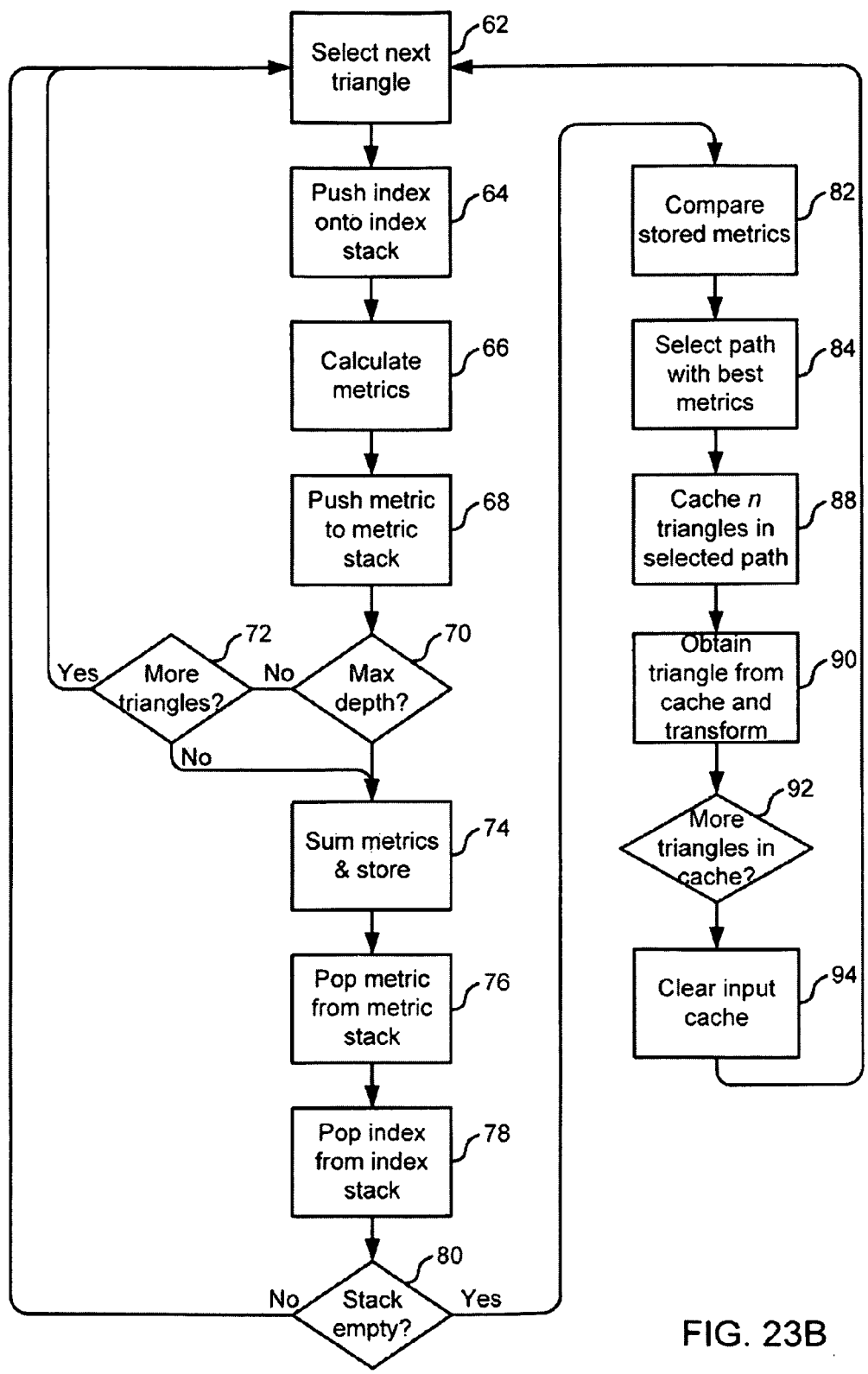

FIG. 23B illustrates an alternative embodiment method in which the evaluated paths are used to process a number of triangles before repeating the process of evaluating the alternative paths in the look-ahead algorithm. Similar to the steps described above with reference to FIG. 23A, the next triangle for evaluation is selected, step 62, its index is pushed onto an index stack, step 64, its associated metrics are calculated, step 66, and pushed onto a metric stack, step 68. If the triangle is not at the maximum depth for evaluation, test 70, and there are more triangles to be evaluated, test 72, the next triangle is selected by returning to step 62. However, if the maximum depth of the valuation has been reached (i.e., test 70="Yes") or there are no more triangles below the selected triangle for evaluation (i.e., test 72="No"), then the metrics for the particular path are summed and stored, step 74. The process moves up to the next triangle for evaluation by removing the last metric from the metric stack memory, step 76, and removing the last index from the index stack, step 78. If the index stack is not empty, test 80, the process continues by selecting the next triangle (i.e. the next alternative from the next triangle above the selected triangle) or, if there are no more indices in the index stack (i.e., test 80="Yes"), then the stored metrics of the various paths. At this point, the selected path is used to select a number of triangles (indicated as n triangles) for processing and conversion before the next look-ahead evaluation is conducted. This may be done by storing the identifiers or indices for the selected n triangles in the selected path, step 88. Such indices or identifiers may be stored in a cache memory or other data structure. The process then proceeds by obtaining the next triangle in the selection, such as by obtaining its identifier or index from the cache, recalling it from memory and converting it as described above with reference to FIG. 5, step 90. If there are more triangles in the cache for selection, test 92, then the next triangle is obtained and converted, step 90. However, if all triangles in the selection have been processed then the input cashe may be cleared, step 94, and the look-ahead evaluation processing repeated using the last converted triangle as the root triangle by returning to step 62 to select a next triangle for evaluation and proceeding as described above.

An example of a recursive software routine which accomplishes the look-ahead triangle evaluation process is provided in the software listing at the end of this specification.

A variety of evaluation criteria may be used in computing the performance-related comparison score for each alternative evaluated triangle strip path. As described above, the criteria may include the number of vertices that must be converted following the path, the number of cache hits that a path will implement, cache coherency, the number of cache misses in a path, or the amount of cache memory that must be utilized to efficiently process the selected of a particular task. As described above with reference to FIG. 21, another criteria is whether a particular path choice isolates one or more triangles that would require starting a new strip to process the isolated triangles. Another criteria that may be used in evaluating paths is the number of degenerate triangles that must be issued to adjust the winding order between triangles in order to follow the path. Other criteria may also be implemented, including, for example, a number of object perimeter sides encompassed within the selected path (which may be important to avoid isolating triangles), the number of triangle moves which are out of sequence with the winding direction of the preceding triangle, or other criteria including user definable criteria may be used in calculating the optimal score. Further, the criteria for evaluating alternative triangle paths may be user selectable as from a menu or in a configuration setup table. Also, combinations of different criteria may be used.

While the foregoing embodiments are described as being performed as the triangles are processed in a graphics pipeline, the results of the analysis may be reused for subsequent processing. Once an optimized triangle strip has been determined for an object by performing one or more triangle strip operations, the optimized strip(s) may be stored so that the same object can be processed using the optimized triangle strip path(s) for rendering.

The foregoing embodiments may also be used for selecting the first triangle for forming a triangle strip. The first triangle, referred to herein as the "seed" triangle may be selected anywhere within a modeled object. A seed triangle on a periphery of the modeled object may have one or two optional directions from which adjacent triangles may be selected for forming triangle strips. A seed triangle within a modeled object may have up to three directional options for forming triangle strips. The seed triangle may have a large impact upon the efficiency of triangle strips which can be formed from that starting point. Thus, important efficiency benefits can be obtained via optimally selecting the proper seed triangle.

To use the foregoing embodiments to select a seed triangle, the process begins by selecting one triangle to serve as a seed and evaluating all of the available triangle paths originating from that seed. A best evaluated score for the optimum triangle path rooted in the selected seed triangle may be stored in memory. Then, another seed triangle is selected for evaluation and the score for the optimum triangle path rooted in the selected seed triangle is determined and stored in memory. This process of selecting a seed triangle and determining the optimum triangle path score is repeated for each triangle that may be selected as a seed triangle. In some implementations, this may be every triangle in the modeled object. In other implementations, known seed selection techniques may be used to preselect a subset of triangles for evaluation using this method.

In a further embodiment, the selection of the seed triangle is based on heuristic methods. In particular, one heuristic seed selection method selects a triangle to serve as a seed based on a recursive evaluation of cache hits on available paths against strips already generated with the assumption that strip generated from the seed triangle will be linked to the already generated strips using degenerates. In this method, the process begins by selecting one triangle to serve as a seed and evaluating all of the available triangle paths originating from that seed. The number of cache hits on already generated strips is recorded for strips leading from the selected seed triangle. Then, another seed triangle is selected for evaluation and the number of cache hits on already generated strips is stored in memory. This process of selecting a seed triangle and determining the number of cache hits on already generated strips is repeated for each triangle that may be selected as a seed triangle. Then the seed triangle that results in the greatest number of cache hits on already generated strips is selected as the seed triangle.

The embodiments described herein may be implemented on any of a variety of mobile devices. Typically, such mobile devices will have in common the components illustrated in FIG. 24. For example, the mobile device 240 may include a processor 241 coupled to internal memory 242 and a display 243. Additionally, the mobile device 240 will have an antenna 244 for sending and receiving electromagnetic radiation that is connected to a wireless data link and/or cellular telephone transceiver 245 coupled to the processor 241. In some implementations, the transceiver 245 and portions of the processor 241 and memory 242 used for cellular telephone communications are collectively referred to as the air interface since it provides a data interface via a wireless data link. Mobile device 240 also typically include a key pad 256 or miniature keyboard and menu selection buttons or rocker switches 247 for receiving user inputs. The mobile device 240 may also include connector plugs (not shown) for connecting data cables to the processor 241, such as a FireWire connector, or external memory devices, such as a USB memory device (not shown).

Figure 25:
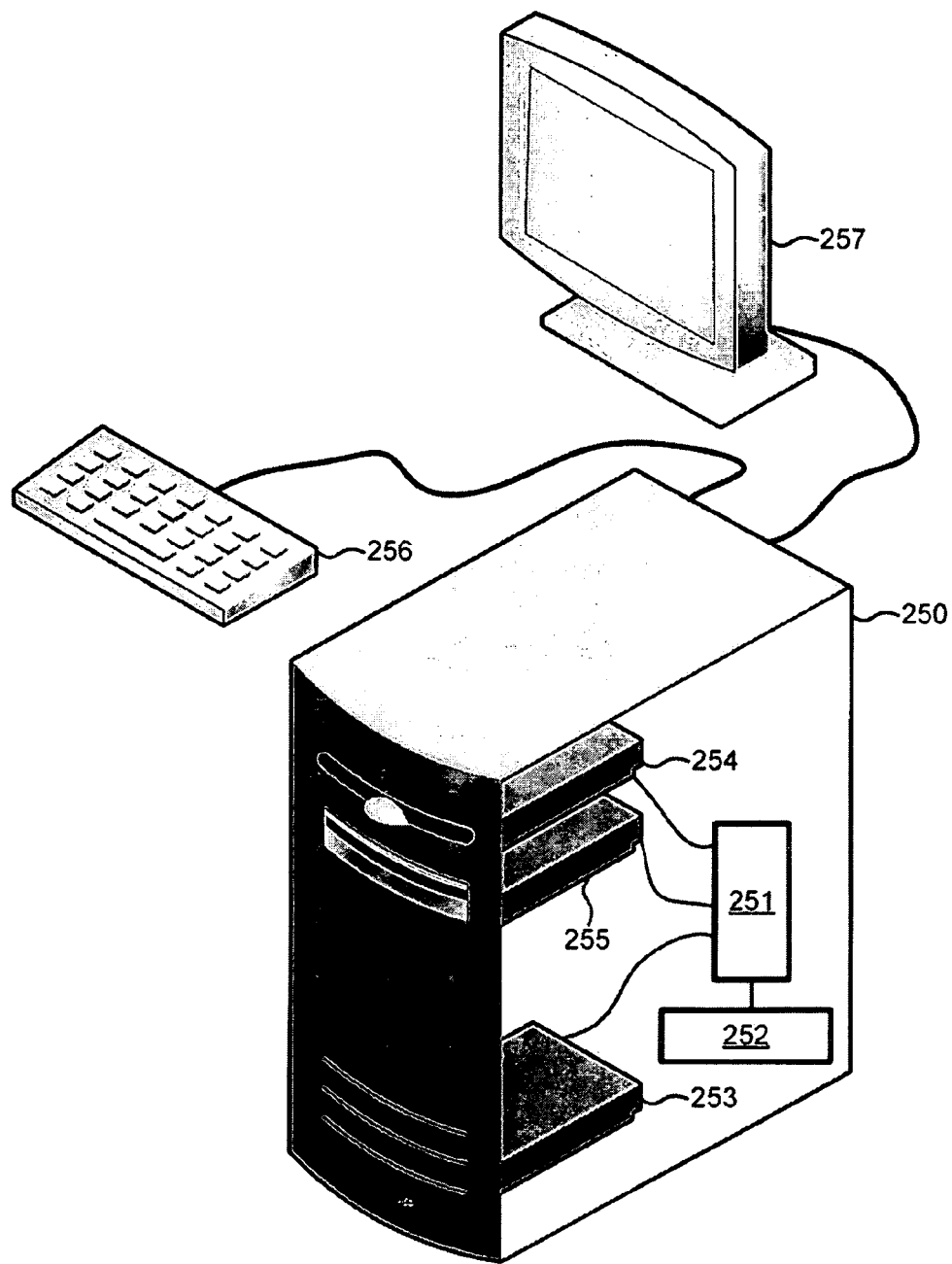
FIG. 25 is a component block diagram of a computer system suitable for use with the various embodiments.

The embodiments described above may also be implemented on any of a variety of computing devices, such as, for example a personal computer 250 illustrated in FIG. 25. Such a personal computer 250 typically includes a processor 251 coupled to volatile memory 252 and a large capacity nonvolatile memory, such as a disk drive 253. The computer 250 may also include a floppy disc drive 254 and a compact disc (CD) drive 255 coupled to the processor 251. Typically the computer 250 will also include a user input device like a keyboard 256 and a display 257. The computer 250 may also include a number of connector ports for receiving external memory devices coupled to the processor 251, such as a universal serial bus (USB) port (not shown), as well as network connection circuits (not shown) for coupling the processor 251 to a network.

The various embodiments may be implemented by a computer processor 251 executing software instructions configured to implement one or more of the described methods. Such software instructions may be stored in memory 252, 253 as separate applications, as part of the computer's operating system software, as a series of APIs implemented by the operating system, or as compiled software implementing an embodiment method. Further, the software instructions may be stored on any form of tangible processor-readable memory, including: a random access memory 252, hard disc memory 253, a floppy disc (readable in a floppy disc drive 254), a compact disc (readable in a CD drive 255), read only memory (such as an EEPROM), and/or a memory module (not shown) plugged into the computer 250, such as an external memory chip or a USB-connectable external memory (e.g., a "flash drive").

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

The following listing provides an example a recursive software routine for accomplishing the look-ahead triangle evaluation process according to an embodiment.

```
// returns the best score and associated adjacent id for each triangle called
// score is tallied on the ascent with some use of the stack
// best path is single value applicable at top branch
float Qstrip::ScoreBestAdjacent(int &best_branch, triangle *evaltri, int search_depth)
{
    int i, found_path;
    float tmp_score, max_score;
```

```
triangle *next_tri, *secondary_isolated;
int best_choice;
float cache_score; // cache coherency bonus
float isolate_score; // isolated tri penalty
float contiguous_score; // keeping mesh contiguous bonus
int any_branch = −1;
found_path = 0;
tmp_score = contiguous_score = cache_score = isolate_score = max_score = 0.0f;
cache_score =(float)m_cachesim.fetch((int)(evaltri->m_indices[0]));
cache_score += m_cachesim.fetch((int)(evaltri->m_indices[1]));
cache_score += m_cachesim.fetch((int)(evaltri->m_indices[2]));
for(i=0;i < evaltri->m_acount; i++)
{
    next_tri = evaltri->get_numbered_neighbor(i);
    if(next_tri)
    {
        if(!next_tri->used)
        {
            found_path = 1;
            if(search_depth > 0)
            {
                next_tri->used = true;
                // this tallies ALL isolated tris created even if they are not selected
                secondary_isolated = next_tri->find_unused_neighbor( );
                if(secondary_isolated)
                {
                    secondary_isolated->used = true;
                    if(!secondary_isolated->find_unused_neighbor( ))
                        isolate_score +=0.5f;
                    secondary_isolated->used = false;
                }
                else
                {
                    isolate_score ++;
                }
                //if(next_tri->count_used_neighbors( )==2) // contiguous only
                if(next_tri->count_unused_neighbors( )==1) // contiguous and edge
                {
                    contiguous_score++;
                }
                next_tri->strip_swap = EvaluateSwap(evaltri, next_tri); // swapmesh
                m_cachesim.push( );
                tmp_score = ScoreBestAdjacent(best_choice, next_tri, search_depth−1);
                m_cachesim.pop( );
                // swapmesh
                if(m_degenEval)
                {
                    if(next_tri->strip_swap)
                        tmp_score −= m_degenerate_penalty;
                    else
                        tmp_score += m_non_degenerate_bonus;
                }
                next_tri->used = false;
            }
            if(tmp_score > max_score)
            {
                max_score = tmp_score;
                best_branch = i;
            }
            any_branch = i;
        }
    }
}
if(found_path)
{
    max_score+=m_length_bonus; // add to score on ascent because this branch has a path
    if(best_branch < 0)
        best_branch = any_branch;
}
if(m_cacheEval)
{
    max_score += cache_score*m_cache_miss_multiplier;
}
max_score −= isolate_score*m_isolate_penalty;
max_score += contiguous_score*m_contiguous_multiplier;
return max_score;
}
```

What is claimed is:

1. A method for selecting graphic triangles for conversion in a graphics processing routine, comprising:
   selecting a triangle for evaluation;
   calculating a metric for the selected triangle;
   recursively repeating steps of selecting a triangle for evaluation and calculating a metric for the selected triangle to a predetermined depth of recursion or until no more triangles can be selected;
   calculating a score for the selected triangles based on the calculated metrics of the selected triangles, wherein the calculated score is a number of cache hits on an already generated triangle strip; and
   choosing a triangle for graphic processing based upon the calculated score.

2. The method of claim 1, wherein selecting a triangle for evaluation involves selecting a triangle that has not been processed or evaluated.

3. The method of claim 1, wherein the selected triangles form a triangle strip suitable for processing in a graphics pipeline.

4. The method of claim 3, wherein calculating the metric for the selected triangle is based upon a criteria selected so that the calculated score for the triangle strip provides a relative measure of graphic processing efficiency of the triangle strip.

5. The method of claim 1, further comprising:
   repeating the steps of recursively repeating the steps of selecting a triangle for evaluation and calculating a metric for the selected triangle to a predetermined depth of recursion or until no more triangles can be selected; and
   calculating a score for the selected triangles based on the calculated metrics of the selected triangles so as to generate a plurality of calculated scores characterizing a plurality of different triangle strip paths,
   wherein selecting a triangle for graphic processing based upon the calculated score comprises selecting a triangle at a beginning of the one of the plurality of different triangle strip paths having a best calculated score.

6. The method of claim 5, further comprising selecting a plurality of triangles for processing within the one of the plurality of different triangle strip paths having the best calculated score.

7. The method of claim 1, further comprising repeating the steps recited in claim 1 after the chosen triangle has been graphically processed so as to choose another triangle for graphic processing.

8. A computer, comprising:
   a processor; and
   a memory coupled to the processor,
   wherein the processor is configured with software instructions to perform steps comprising:
      selecting a triangle for evaluation;
      calculating a metric for the selected triangle;
      recursively repeating steps of selecting a triangle for evaluation and calculating a metric for the selected triangle to a predetermined depth of recursion or until no more triangles can be selected;
      calculating a score for the selected triangles based on the calculated metrics of the selected triangles, wherein the calculated score is a number of cache hits on an already generated triangle strip; and
      choosing a triangle for graphic processing based upon the calculated score.

9. The computer of claim 8, wherein the processor is configured with software instructions so that the step of selecting a triangle for evaluation involves selecting a triangle that has not been processed or evaluated.

10. The computer of claim 8, wherein the processor is configured with software instructions so that the selected triangles form a triangle strip suitable for processing in a graphics pipeline.

11. The computer of claim 8, wherein the processor is configured with software instructions so that the step of calculating the metric for the selected triangle is based upon a criteria selected so that the calculated score for the triangle strip provides a relative measure of graphic processing efficiency of the triangle strip.

12. The computer of claim 8, wherein the processor is configured with software instructions to perform steps further comprising:
   repeating the steps of recursively repeating the steps of selecting a triangle for evaluation and calculating a metric for the selected triangle to a predetermined depth of recursion or until no more triangles can be selected; and
   calculating a score for the selected triangles based on the calculated metrics of the selected triangles so as to generate a plurality of calculated scores characterizing a plurality of different triangle strip paths,
   wherein selecting a triangle for graphic processing based upon the calculated score comprises selecting a triangle at a beginning of the one of the plurality of different triangle strip paths having a best calculated score.

13. The computer of claim 12, wherein the processor is configured with software instructions to perform steps further comprising selecting a plurality of triangles for processing within the one of the plurality of different triangle strip paths having the best calculated score.

14. The computer of claim 8, wherein the processor is configured with software instructions to perform steps further comprising repeating the steps recited in claim 9 after the chosen triangle has been graphically processed so as to choose another triangle for graphic processing.

15. A computer, comprising:
   means for selecting a triangle for evaluation;
   means for calculating a metric for the selected triangle;
   means for recursively repeating steps of selecting a triangle for evaluation and calculating a metric for the selected triangle to a predetermined depth of recursion or until no more triangles can be selected;
   means for calculating a score for the selected triangles based on the calculated metrics of the selected triangles, wherein the calculated score is a number of cache hits on an already generated triangle strip; and
   means for choosing a triangle for graphic processing based upon the calculated score.

16. The computer of claim 15, further comprising means for forming a triangle strip suitable for processing in a graphics pipeline from the selected triangles.

17. The computer of claim 15, wherein the means for selecting a triangle for evaluation comprises means for selecting a triangle that has not been processed or evaluated.

18. The computer of claim 15, wherein the means for calculating the metric for the selected triangle uses a criteria selected so that the calculated score for the triangle strip provides a relative measure of graphic processing efficiency of the triangle strip.

19. The computer of claim 15, further comprising:
   means for repeating the steps of recursively repeating the steps of selecting a triangle for evaluation and calculating a metric for the selected triangle to a predetermined depth of recursion or until no more triangles can be selected; and means for calculating a score for the selected triangles based on the calculated metrics of the selected triangles so as to generate a plurality of calculated scores characterizing a plurality of different triangle strip paths, wherein the means for selecting a triangle for graphic processing based upon the calculated score comprises means for selecting a triangle at a beginning of the one of the plurality of different triangle strip paths having a best calculated score.

20. The computer of claim 19, further comprising means for selecting a plurality of triangles for processing within the one of the plurality of different triangle strip paths having the best calculated score.

21. A non-transitory processor-readable storage medium having stored thereon processor-executable software instructions configured to cause a processor of a computer to perform steps comprising:
    selecting a triangle for evaluation;
    calculating a metric for the selected triangle;
    recursively repeating steps of selecting a triangle for evaluation and calculating a metric for the selected triangle to a predetermined depth of recursion or until no more triangles can be selected;
    calculating a score for the selected triangles based on the calculated metrics of the selected triangles, wherein the calculated score is a number of cache hits on an already generated triangle strip; and
    choosing a triangle for graphic processing based upon the calculated score.

22. The non-transitory processor-readable storage medium of claim 21, wherein selecting a triangle for evaluation involves selecting a triangle that has not been processed or evaluated.

23. The non-transitory processor-readable storage medium of claim 21, wherein the selected triangles form a triangle strip suitable for processing in a graphics pipeline.

24. The non-transitory processor-readable storage medium of claim 21, wherein calculating the metric for the selected triangle is based upon a criteria selected so that the calculated score for the triangle strip provides a relative measure of graphic processing efficiency of the triangle strip.

25. The non-transitory processor-readable storage medium of claim 21, wherein the stored processor-executable software instructions are configured to cause a processor of a computer to perform further steps comprising:
    repeating the steps of recursively repeating the steps of selecting a triangle for evaluation and calculating a metric for the selected triangle to a predetermined depth of recursion or until no more triangles can be selectet; and
    calculating a score for the selected triangles based on the calculated metrics of the selected triangles so as to generate a plurality of calculated scores characterizing a plurality of different triangle strip paths,
    wherein selecting a triangle for graphic processing based upon the calculated score comprises selecting a triangle at a beginning of the one of the plurality of different triangle strip paths having a best calculated score.

26. The non-transitory processor-readable storage medium of claim 25, wherein the stored processor-executable software instructions are configured to cause a processor of a computer to perform further steps comprising:
    selecting a plurality of triangles for processing within the one of the plurality of different triangle strip paths having the best calculated score.

27. The non-transitory processor-readable storage medium of claim 21, wherein the stored processor-executable software instructions configured to cause a processor of a computer to perform further steps comprising:
    repeating the steps recited in claim 24 after the chosen triangle has been graphically processed so as to choose another triangle for graphic processing.

28. A method for selecting a seed triangle for performing graphics processing on a modeled graphic object, comprising:
    selecting a first candidate seed triangle;
    selecting a first adjacent triangle adjacent to the first candidate seed triangle for evaluation;
    calculating a metric for the selected adjacent triangle;
    recursively repeating steps of selecting a triangle adjacent to the previously selected adjacent triangle for evaluation and calculating a metric for the selected adjacent triangle to a predetermined depth of recursion or until no more triangles can be selected;
    calculating a score for the selected triangles based on the calculated metrics of the selected triangles;
    selecting a second adjacent triangle adjacent to the first candidate seed triangle for evaluation;
    calculating a metric for the second selected adjacent triangle;
    recursively repeating steps of selecting a triangle adjacent to the previously selected adjacent triangle for evaluation and calculating a metric for the selected adjacent triangle to a predetermined depth of recursion or until no more triangles can be selected;
    calculating a score for the selected triangles based on the calculated metrics of the selected triangles;
    determining a first highest score associate with the selected first candidate seed triangle;
    selecting a second candidate seed triangle;
    selecting a first adjacent triangle adjacent to the second candidate seed triangle for evaluation;
    calculating a metric for the selected adjacent triangle;
    recursively repeating steps of selecting a triangle adjacent to the previously selected adjacent triangle for evaluation and calculating a metric for the selected adjacent triangle to a predetermined depth of recursion or until no more triangles can be selected;
    calculating a score for the selected triangles based on the calculated metrics of the selected triangles;
    selecting a second adjacent triangle adjacent to the second candidate seed triangle for evaluation;
    calculating a metric for the second selected adjacent triangle;
    recursively repeating steps of selecting a triangle adjacent to the previously selected adjacent triangle for evaluation and calculating a metric for the selected adjacent triangle to a predetermined depth of recursion or until no more triangles can be selected;
    calculating a score for the selected triangles based on the calculated metrics of the selected triangles;
    determining a second highest score associated with the selected second candidate seed triangle; and
    choosing one of the first and second candidate seed triangles for use as a seed triangle for graphic processing based upon the first and second highest scores associated with first and second candidate seed triangles.

29. A computer, comprising:
    a processor; and
    a memory coupled to the processor,
    wherein the processor is configured with software instructions to perform steps comprising:

selecting a first candidate seed triangle;
selecting a first adjacent triangle adjacent to the first candidate seed triangle for evaluation;
calculating a metric for the selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
selecting a second adjacent triangle adjacent to the first candidate seed triangle for evaluation;
calculating a metric for the second selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
determining a first highest score associate with the selected first candidate seed triangle;
selecting a second candidate seed triangle;
selecting a first adjacent triangle adjacent to the second candidate seed triangle for evaluation;
calculating a metric for the selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
selecting a second adjacent triangle adjacent to the second candidate seed triangle for evaluation;
calculating a metric for the second selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
determining a second highest score associated with the selected second candidate seed triangle; and
choosing one of the first and second candidate seed triangles for use as a seed triangle for graphic processing based upon the first and second highest scores associated with first and second candidate seed triangles.

30. A computer, comprising:
means for selecting a first candidate seed triangle;
means for selecting a first adjacent triangle adjacent to the first candidate seed triangle for evaluation;
means for calculating a metric for the selected adjacent triangle;
means for recursively repeating steps of selecting a triangle adjacent to the previously selected adjacent triangle for evaluation and calculating a metric for the selected adjacent triangle to a predetermined depth of recursion or until no more triangles can be selected;
means for calculating a score for the selected triangles based on the calculated metrics of the selected triangles;
means for selecting a second adjacent triangle adjacent to the first candidate seed triangle for evaluation;
means for calculating a metric for the second selected adjacent triangle;
means for recursively repeating steps of selecting a triangle adjacent to the previously selected adjacent triangle for evaluation and calculating a metric for the selected adjacent triangle to a predetermined depth of recursion or until no more triangles can be selected;
means for calculating a score for the selected triangles based on the calculated metrics of the selected triangles;
means for determining a first highest score associate with the selected first candidate seed triangle;
means for selecting a second candidate seed triangle;
means for selecting a first adjacent triangle adjacent to the second candidate seed triangle for evaluation;
means for calculating a metric for the selected adjacent triangle;
means for recursively repeating steps of selecting a triangle adjacent to the previously selected adjacent triangle for evaluation and calculating a metric for the selected adjacent triangle to a predetermined depth of recursion or until no more triangles can be selected;
means for calculating a score for the selected triangles based on the calculated metrics of the selected triangles;
means for selecting a second adjacent triangle adjacent to the second candidate seed triangle for evaluation;
means for calculating a metric for the second selected adjacent triangle;
means for recursively repeating steps of selecting a triangle adjacent to the previously selected adjacent triangle for evaluation and calculating a metric for the selected adjacent triangle to a predetermined depth of recursion or until no more triangles can be selected;
means for calculating a score for the selected triangles based on the calculated metrics of the selected triangles;
means for determining a second highest score associated with the selected second candidate seed triangle; and
means for choosing one of the first and second candidate seed triangles for use as a seed triangle for graphic processing based upon the first and second highest scores associated with first and second candidate seed triangles.

31. A non-transitory processor-readable storage medium having stored thereon processor-executable software instructions configured to cause a processor of a computer to perform steps comprising:
selecting a first candidate seed triangle;
selecting a first adjacent triangle adjacent to the first candidate seed triangle for evaluation;
calculating a metric for the selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
selecting a second adjacent triangle adjacent to the first candidate seed triangle for evaluation;
calculating a metric for the second selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;

calculating a score for the selected triangles based on the calculated metrics of the selected triangles;
determining a first highest score associate with the selected first candidate seed triangle;
selecting a second candidate seed triangle;
selecting a first adjacent triangle adjacent to the second candidate seed triangle for evaluation;
calculating a metric for the selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
selecting a second adjacent triangle adjacent to the second candidate seed triangle for evaluation;
calculating a metric for the second selected adjacent triangle;
recursively repeating steps of selecting a triangle adjacent to the previously selected adjacent triangle for evaluation and calculating a metric for the selected adjacent triangle to a predetermined depth of recursion or until no more triangles can be selected;
calculating a score for the selected triangles based on the calculated metrics of the selected triangles;
determining a second highest score associated with the selected second candidate seed triangle; and
choosing one of the first and second candidate seed triangles for use as a seed triangle for graphic processing based upon the first and second highest scores associated with first and second candidate seed triangles.

32. A method for selecting a seed triangle for performing graphics processing on a modeled graphic object, comprising:
selecting a first candidate seed triangle;
selecting a first adjacent triangle adjacent to the first candidate seed triangle for evaluation;
counting a number of vertices on the selected adjacent triangle that are stored in cache as a result of being part of already generated triangle strips;
recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;
calculating a total number of vertices already cache as a result of being part of already generated triangle strips;
selecting a second adjacent triangle adjacent to the first candidate seed triangle for evaluation;
counting a number of vertices on the second selected adjacent triangle that are stored in cache as a result of being part of already generated triangle strips;
recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;
calculating a total number of vertices already cache as a result of being part of already generated triangle strips;
determining a first highest total number of vertices already cache as a result of being part of already generated triangle strips associate with the selected first candidate seed triangle;
selecting a second candidate seed triangle;
selecting a first adjacent triangle adjacent to the second candidate seed triangle for evaluation;
counting a number of vertices the selected adjacent triangle that are stored in cache as a result of being part of already generated triangle strips;
recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;
calculating a total number of vertices already cache as a result of being part of already generated triangle strips;
selecting a second adjacent triangle adjacent to the second candidate seed triangle for evaluation;
counting a number of vertices on the second selected adjacent triangle that are stored in cache as a result of being part of already generated triangle strips;
recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;
calculating a total number of vertices already cache as a result of being part of already generated triangle strips;
determining a second highest total number of vertices already cache as a result of being part of already generated triangle strips associated with the selected second candidate seed triangle; and
choosing one of the first and second candidate seed triangles for use as a seed triangle for graphic processing based upon the first and second highest total number of vertices already cache as a result of being part of already generated triangle strips associated with first and second candidate seed triangles.

33. A computer, comprising:
a processor; and
a memory coupled to the processor,
wherein the processor is configured with software instructions to perform steps comprising:
selecting a first candidate seed triangle;
selecting a first adjacent triangle adjacent to the first candidate seed triangle for evaluation;
counting a number of vertices on the selected adjacent triangle that are stored in cache as a result of being part of already generated triangle strips;
recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;
calculating a total number of vertices already cache as a result of being part of already generated triangle strips;
selecting a second adjacent triangle adjacent to the first candidate seed triangle for evaluation;

counting a number of vertices on the second selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

determining a first highest total number of vertices already cache as a result of being part of already generated triangle strips associate with the selected first candidate seed triangle;

selecting a second candidate seed triangle;

selecting a first adjacent triangle adjacent to the second candidate seed triangle for evaluation;

counting a number of vertices the selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

selecting a second adjacent triangle adjacent to the second candidate seed triangle for evaluation;

counting a number of vertices on the second selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

determining a second highest total number of vertices already cache as a result of being part of already generated triangle strips associated with the selected second candidate seed triangle; and choosing one of the first and second candidate seed triangles for use as a seed triangle for graphic processing based upon the first and second highest total number of vertices already cache as a result of being part of already generated triangle strips associated with first and second candidate seed triangles.

34. A computer, comprising:

means for selecting a first candidate seed triangle;

means for selecting a first adjacent triangle adjacent to the first candidate seed triangle for evaluation;

means for counting a number of vertices on the selected adjacent triangle that are stored in cache as a result of being part of already generated triangle strips;

means for recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

means for calculating a total number of vertices already cache as a result of being part of already generated triangle strips;

means for selecting a second adjacent triangle adjacent to the first candidate seed triangle for evaluation;

means for counting a number of vertices on the second selected adjacent triangle that are stored in cache as a result of being part of already generated triangle strips;

means for recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

means for calculating a total number of vertices already cache as a result of being part of already generated triangle strips;

means for determining a first highest total number of vertices already cache as a result of being part of already generated triangle strips associate with the selected first candidate seed triangle;

means for selecting a second candidate seed triangle;

means for selecting a first adjacent triangle adjacent to the second candidate seed triangle for evaluation;

means for counting a number of vertices the selected adjacent triangle that are stored in cache as a result of being part of already generated triangle strips;

means for recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

means for calculating a total number of vertices already cache as a result of being part of already generated triangle strips;

means for selecting a second adjacent triangle adjacent to the second candidate seed triangle for evaluation;

means for counting a number of vertices on the second selected adjacent triangle that are stored in cache as a result of being part of already generated triangle strips;

means for recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

means for calculating a total number of vertices already cache as a result of being part of already generated triangle strips;

means for determining a second highest total number of vertices already cache as a result of being part of already generated triangle strips associated with the selected second candidate seed triangle; and means for choosing one of the first and second candidate seed triangles for use as a seed triangle for graphic processing based upon the first and second highest total number of vertices already cache as a result of being part of already generated triangle strips associated with first and second candidate seed triangles.

35. A non-transitory processor-readable storage medium having stored thereon processor-executable software instructions configured to cause a processor of a computer to perform steps comprising:

selecting a first candidate seed triangle;

selecting a first adjacent triangle adjacent to the first candidate seed triangle for evaluation;

counting a number of vertices on the selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

selecting a second adjacent triangle adjacent to the first candidate seed triangle for evaluation;

counting a number of vertices on the second selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

determining a first highest total number of vertices already cache as a result of being part of already generated triangle strips associate with the selected first candidate seed triangle;

selecting a second candidate seed triangle;

selecting a first adjacent triangle adjacent to the second candidate seed triangle for evaluation;

counting a number of vertices the selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

selecting a second adjacent triangle adjacent to the second candidate seed triangle for evaluation;

counting a number of vertices on the second selected adjacent triangle that are stored in cache as a result of being part of already generated triangle strips;

recursively repeating steps of selecting a triangle adjacent to the previously selected adjacent triangle for evaluation and counting a number of vertices on the selected adjacent triangle that are stored in cache as a result of being part of already generated triangle strips to a predetermined depth of recursion or until no more triangles can be selected;

calculating a total number of vertices already cache as a result of being part of already generated triangle strips;

determining a second highest total number of vertices already cache as a result of being part of already generated triangle strips associated with the selected second candidate seed triangle; and choosing one of the first and second candidate seed triangles for use as a seed triangle for graphic processing based upon the first and second highest total number of vertices already cache as a result of being part of already generated triangle strips associated with first and second candidate seed triangles.

* * * * *